Aug. 30, 1938.   W. C. GOSS   2,128,241
BRIQUETTE PRESS
Filed Jan. 4, 1936   25 Sheets-Sheet 1
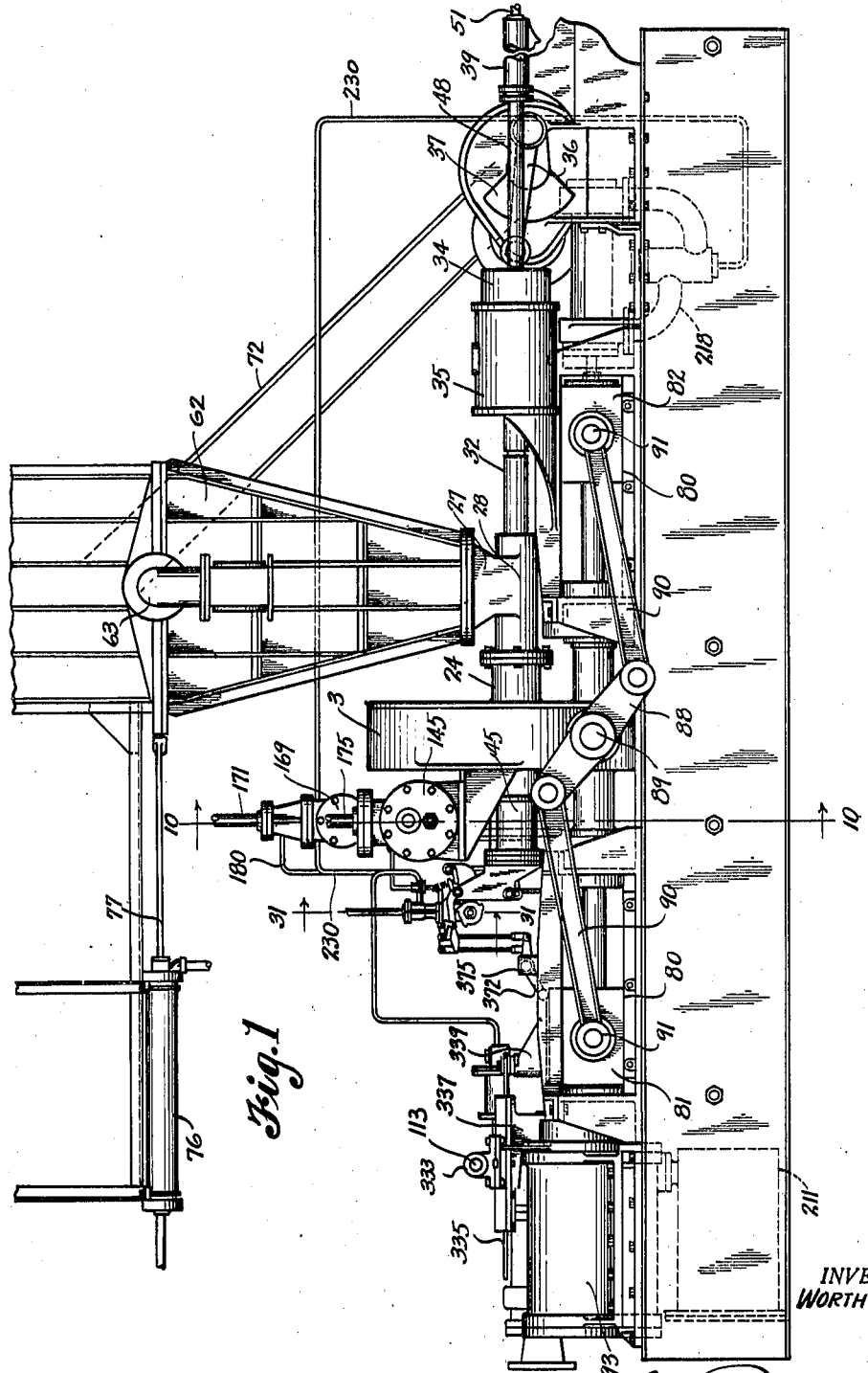
INVENTOR.
WORTH C. GOSS
ATTORNEYS.

Aug. 30, 1938.  W. C. GOSS  2,128,241
BRIQUETTE PRESS
Filed Jan. 4, 1936  25 Sheets-Sheet 2
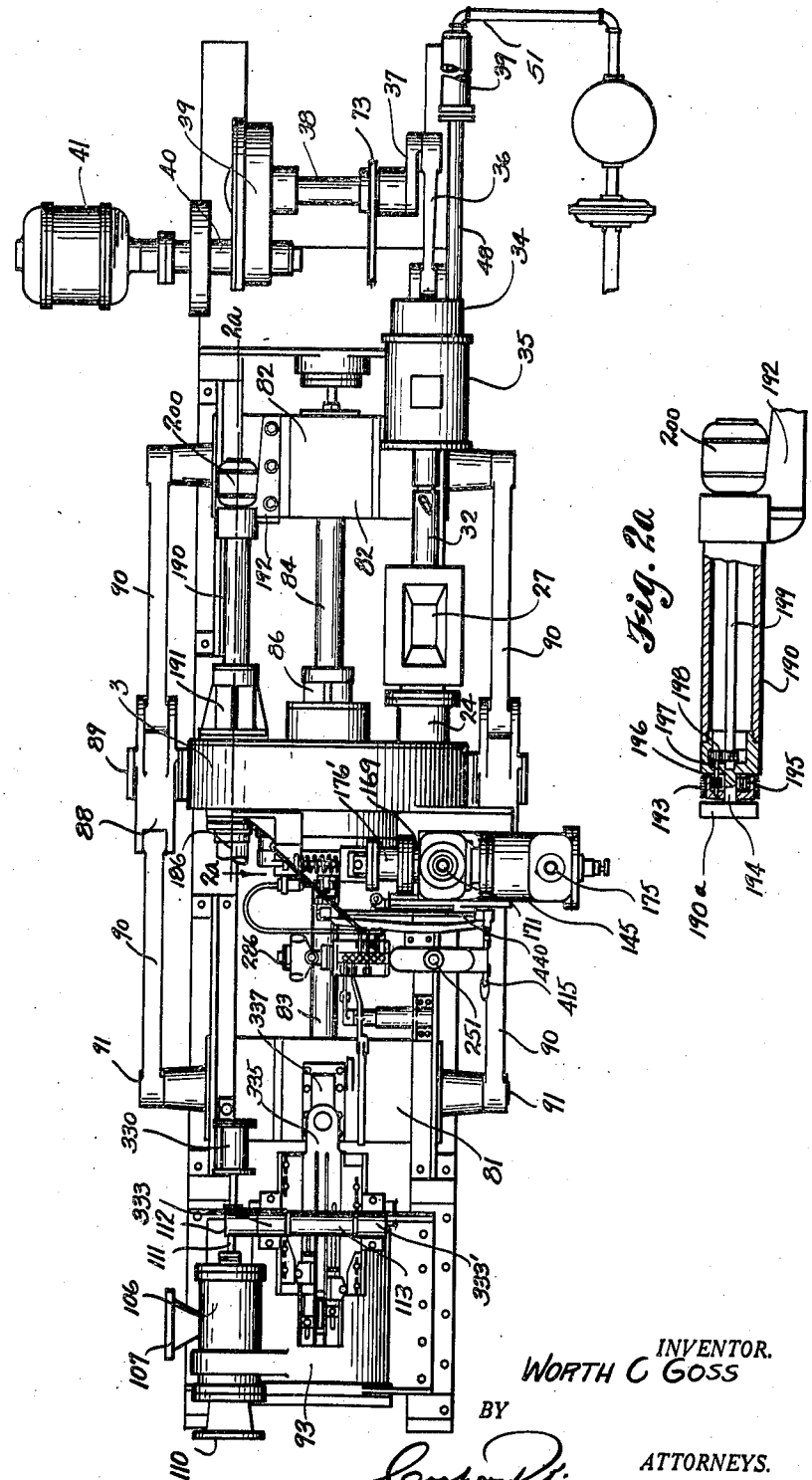
INVENTOR.
WORTH C GOSS
BY
ATTORNEYS.

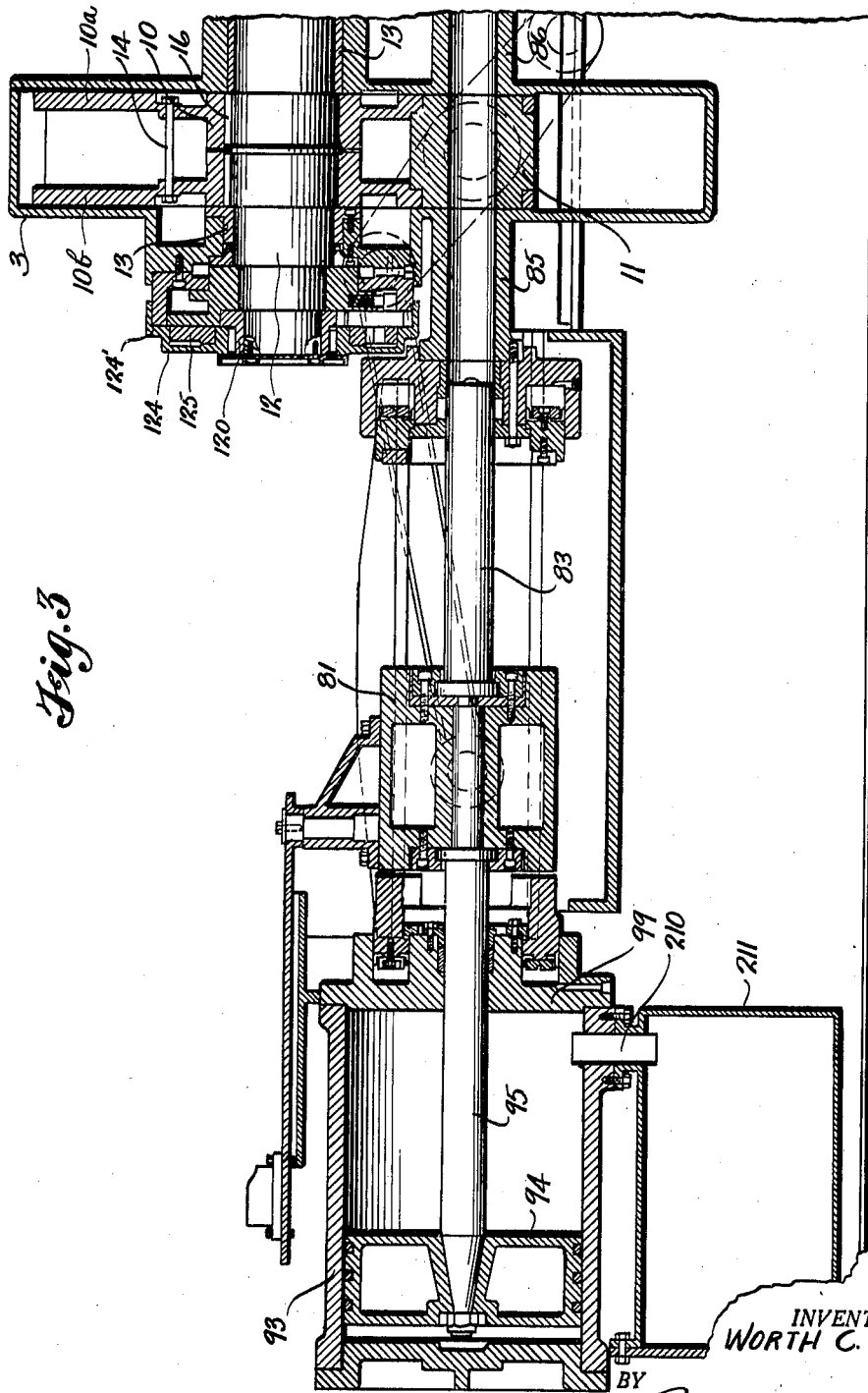

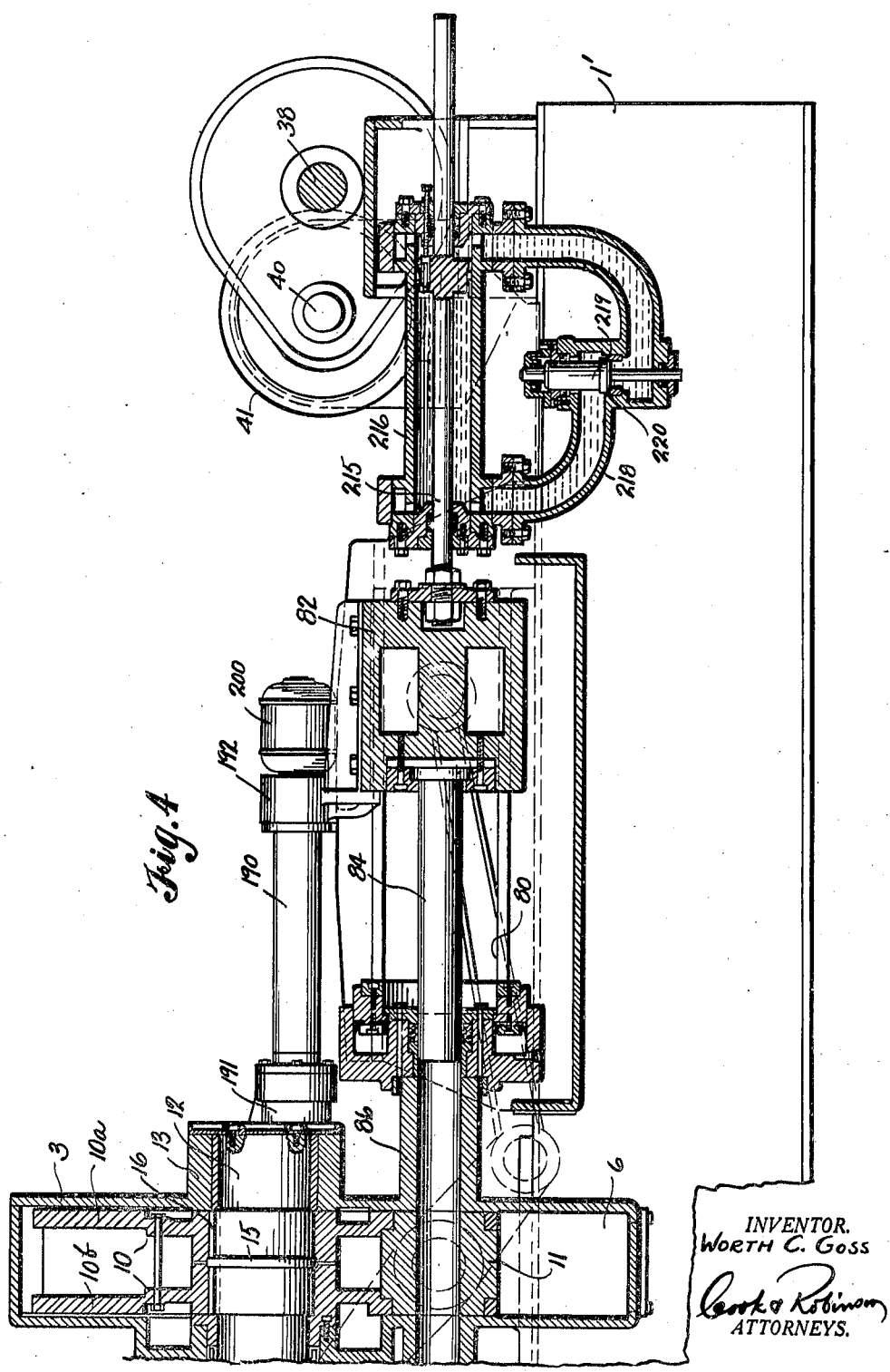

Aug. 30, 1938.  W. C. GOSS  2,128,241
BRIQUETTE PRESS
Filed Jan. 4, 1936  25 Sheets-Sheet 5
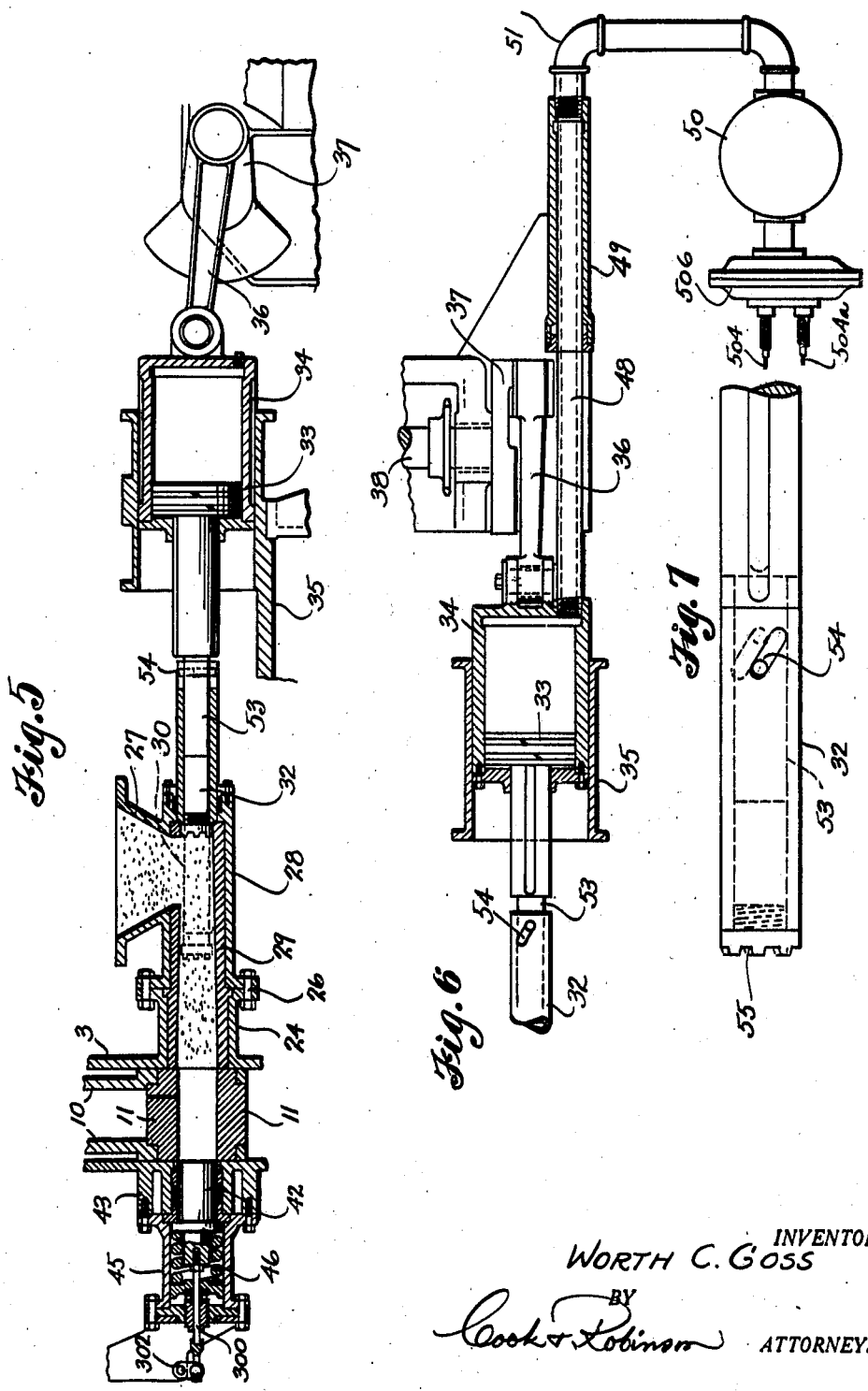
INVENTOR.
WORTH C. GOSS
BY
Cook & Robinson ATTORNEYS.

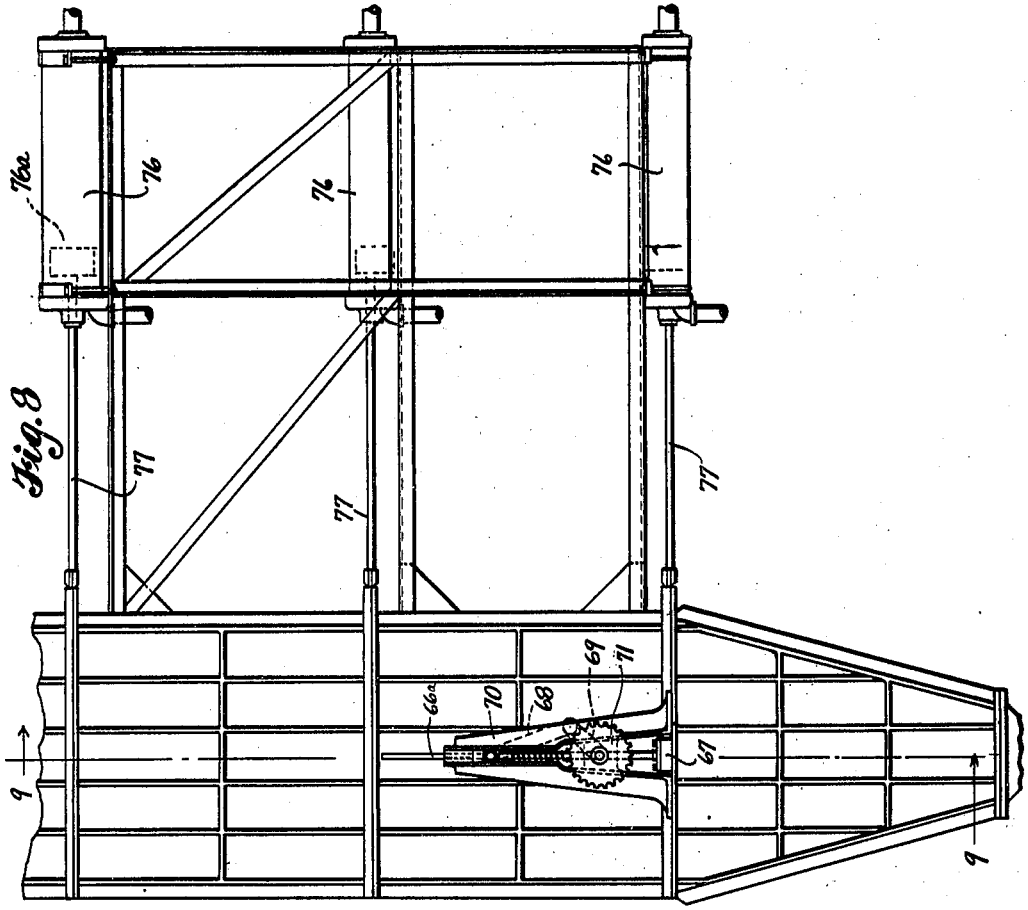

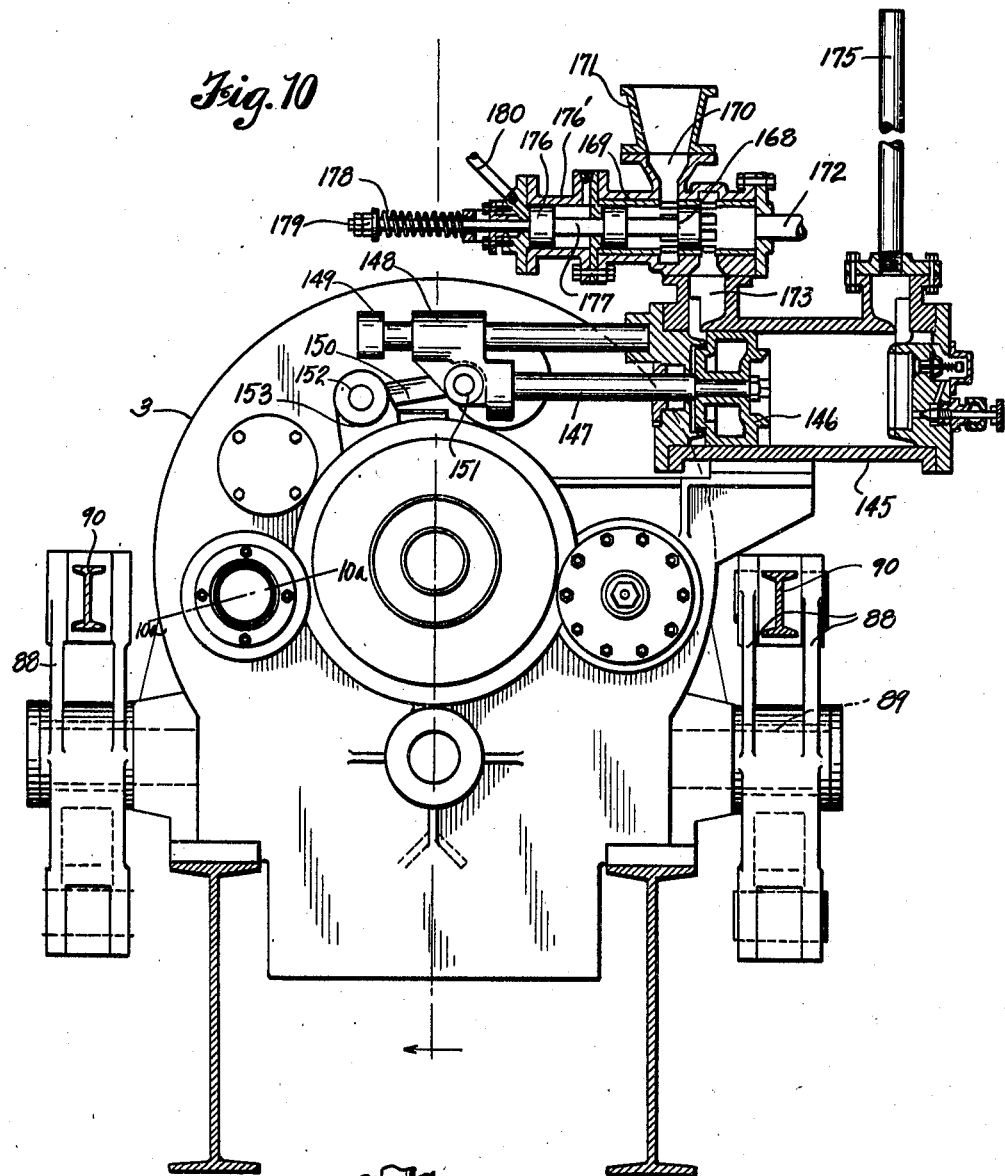
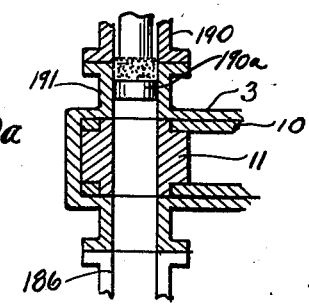

Aug. 30, 1938.  W. C. GOSS  2,128,241
BRIQUETTE PRESS
Filed Jan. 4, 1936  25 Sheets-Sheet 8

INVENTOR.
Worth C. Goss
BY
Cook + Robinson ATTORNEYS.

Aug. 30, 1938.　　　W. C. GOSS　　　2,128,241
BRIQUETTE PRESS
Filed Jan. 4, 1936　　25 Sheets-Sheet 9
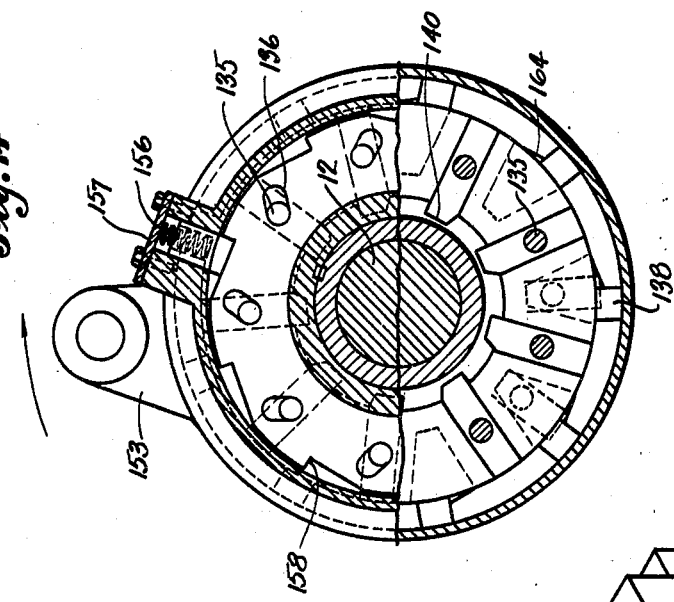
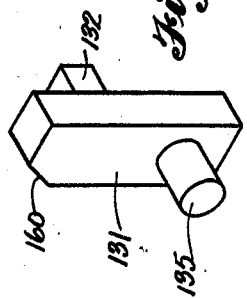
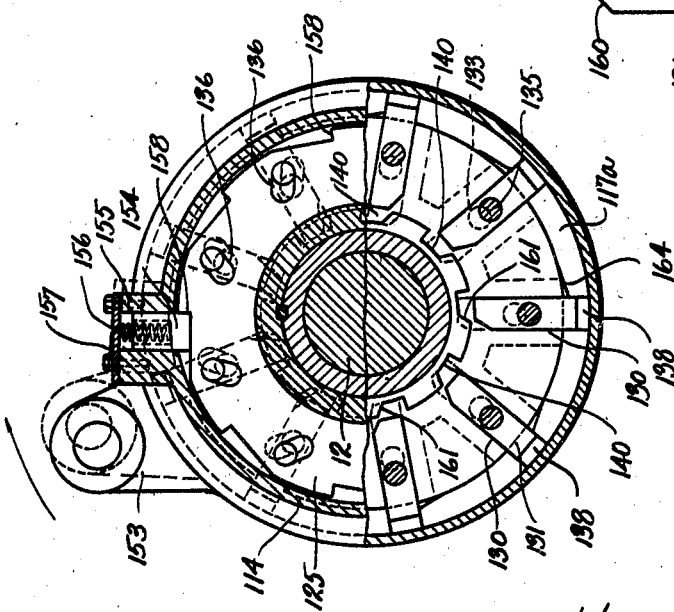
INVENTOR.
WORTH C. GOSS
BY
Cook & Robinson ATTORNEYS.

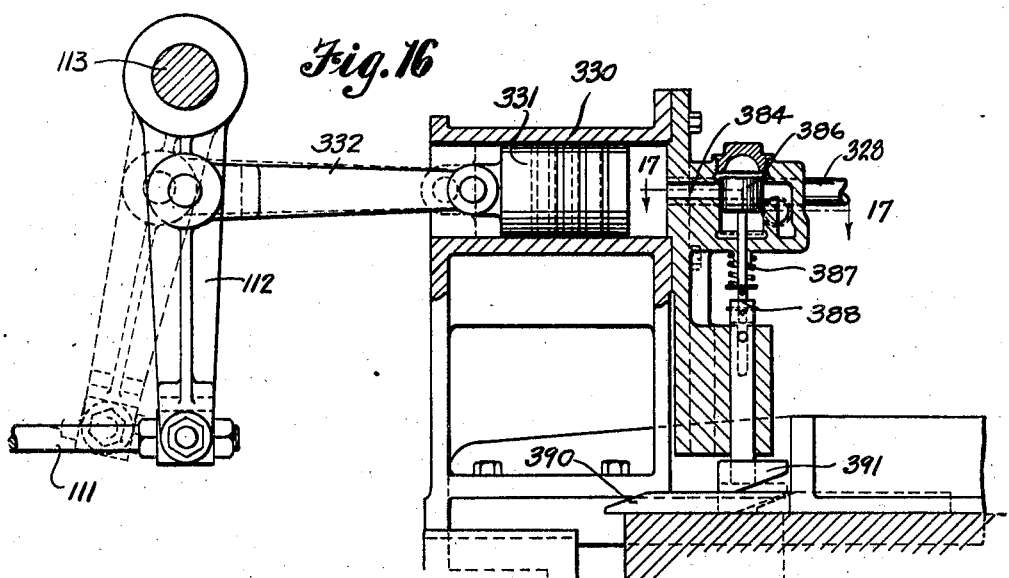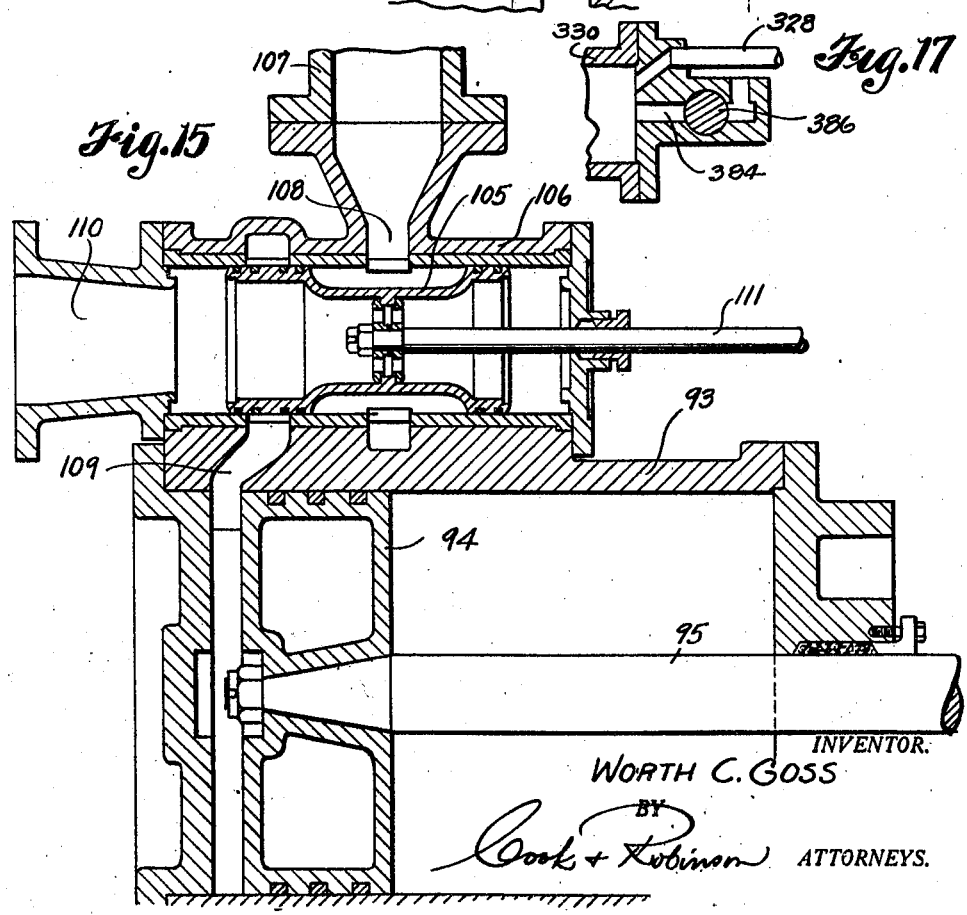

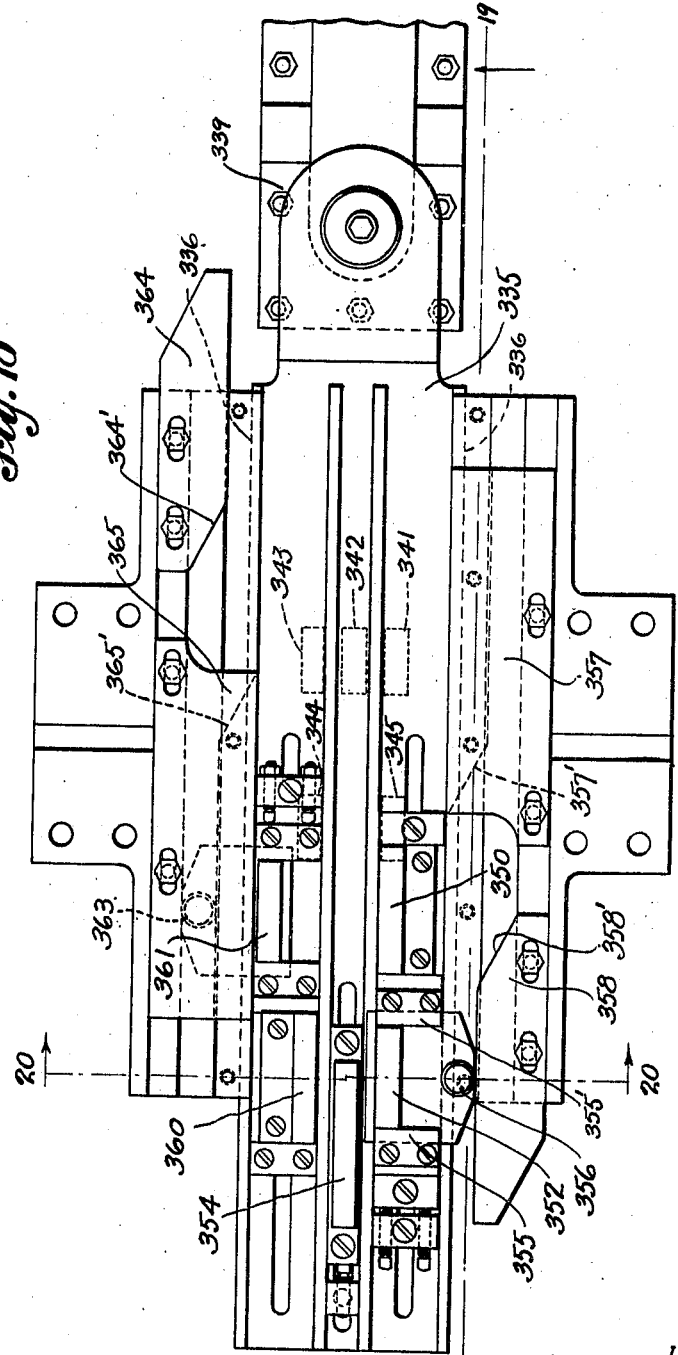

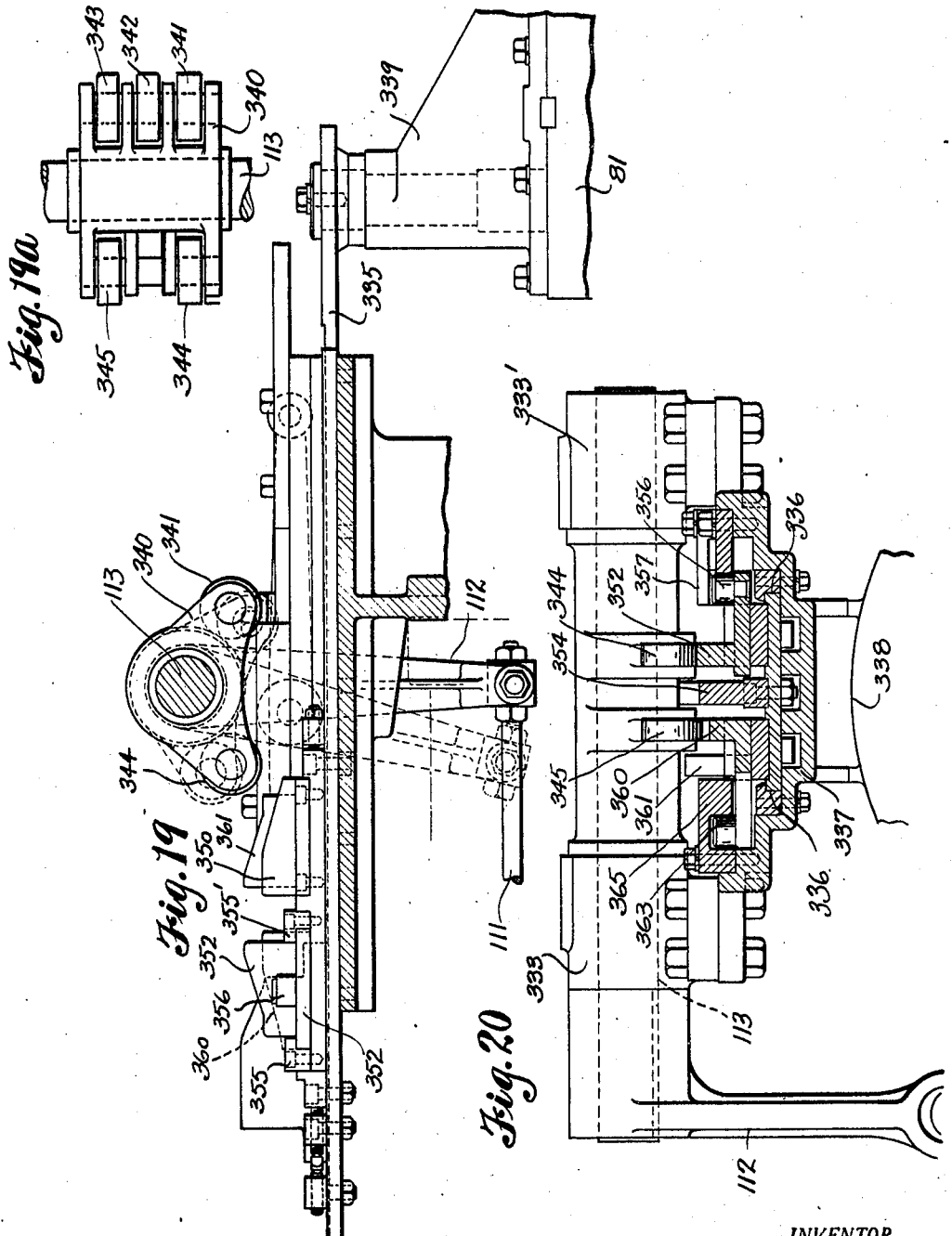

Aug. 30, 1938.  W. C. GOSS  2,128,241
BRIQUETTE PRESS
Filed Jan. 4, 1936  25 Sheets-Sheet 13
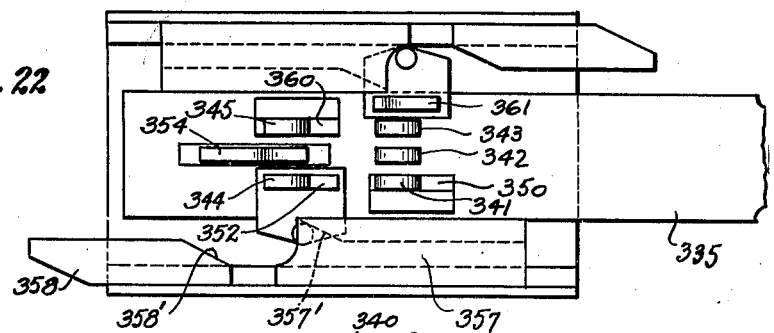
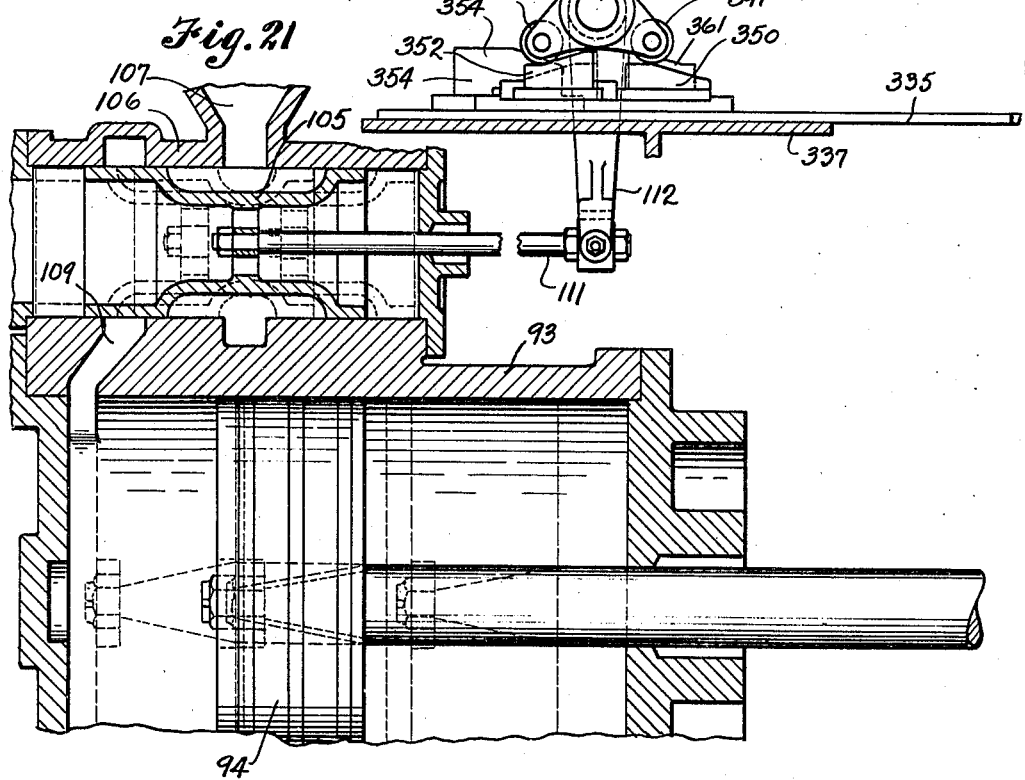
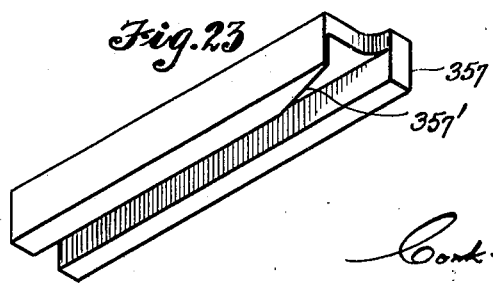
INVENTOR.
WORTH C. GOSS
BY
ATTORNEYS.

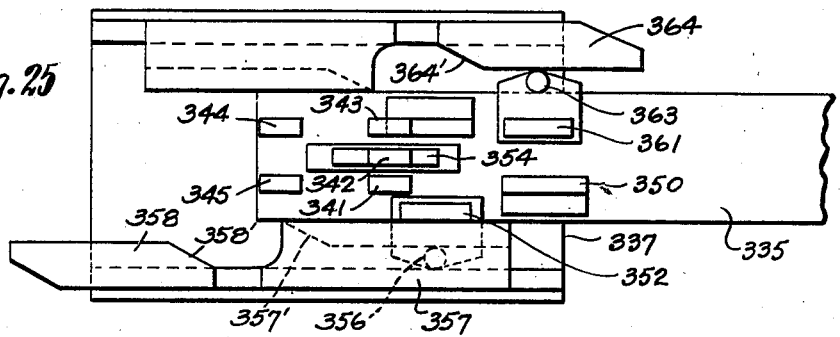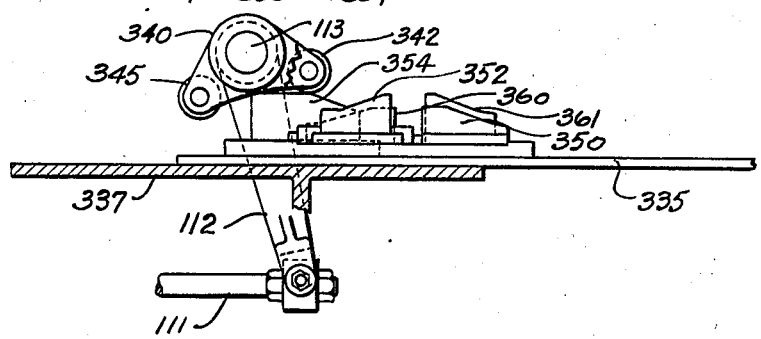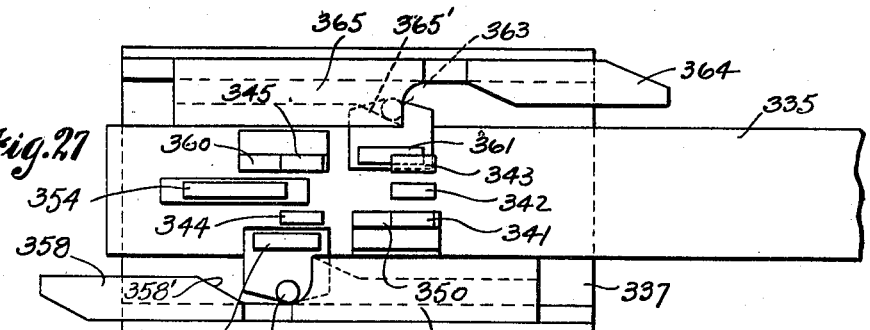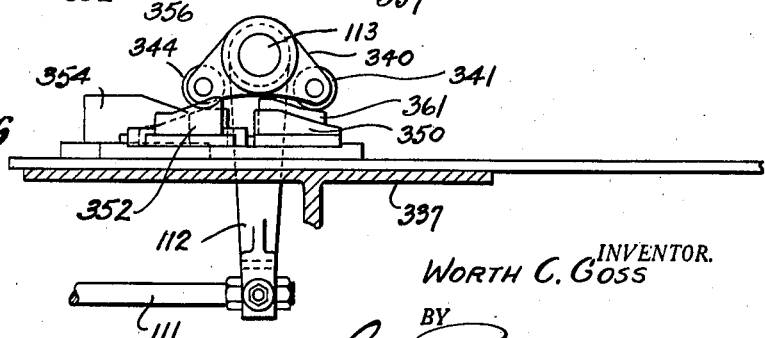

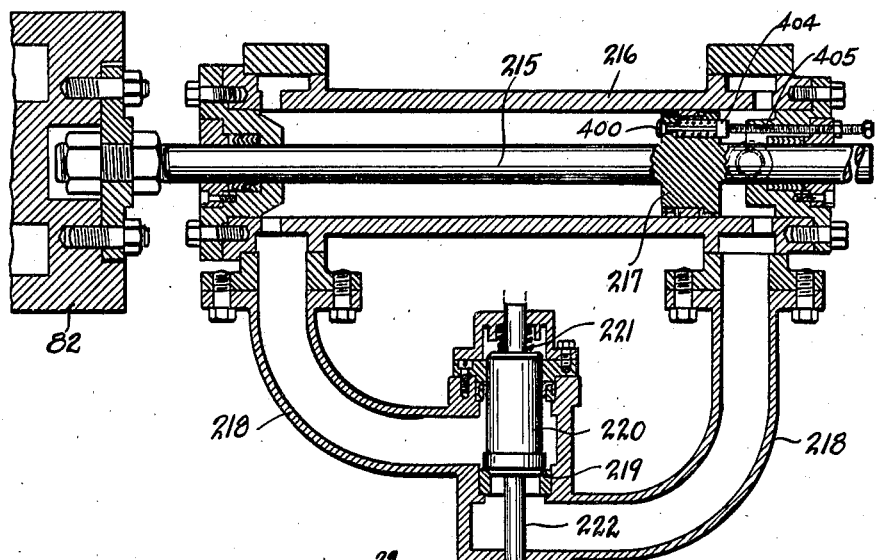
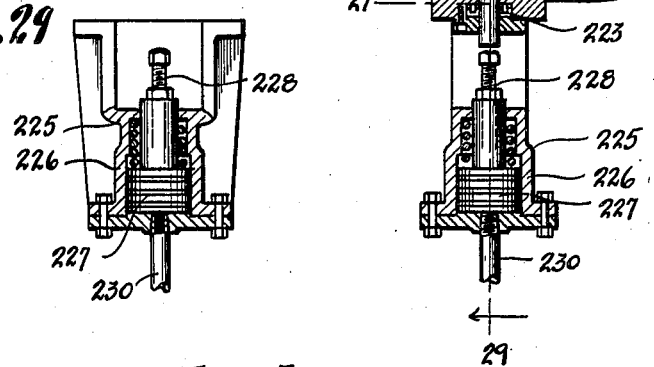
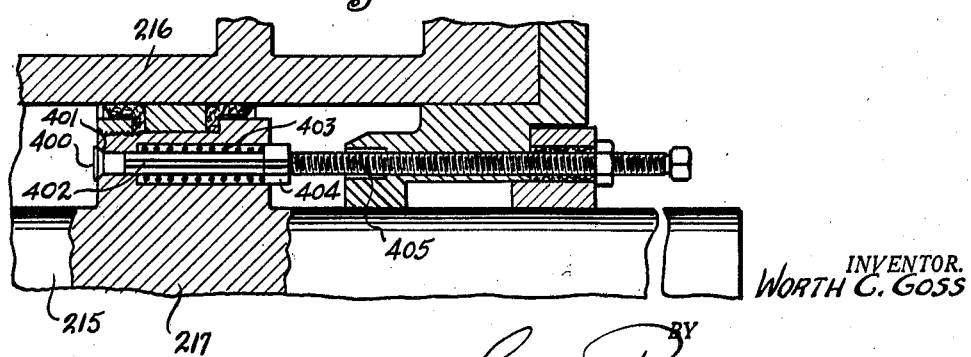

Aug. 30, 1938.  W. C. GOSS  2,128,241
BRIQUETTE PRESS
Filed Jan. 4, 1936   25 Sheets-Sheet 16
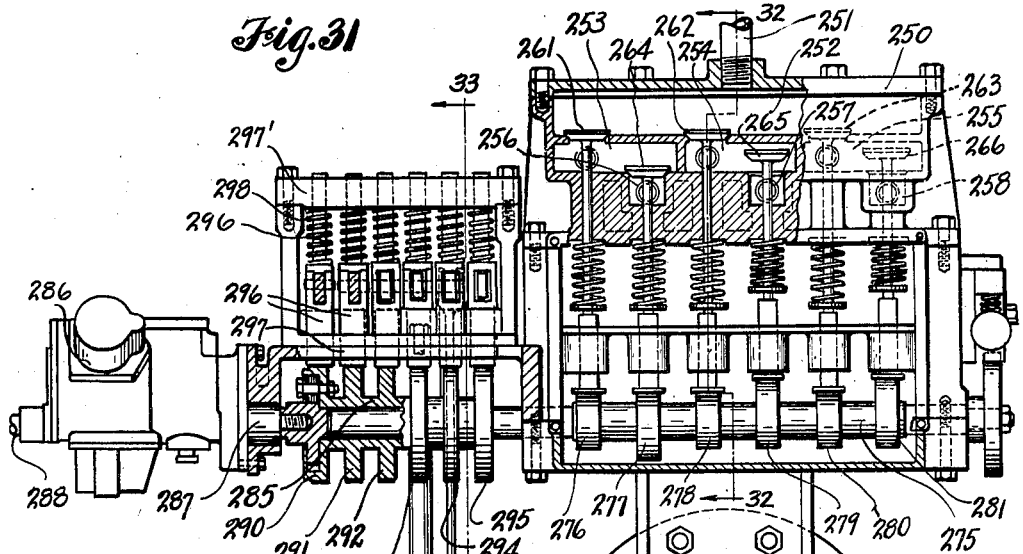
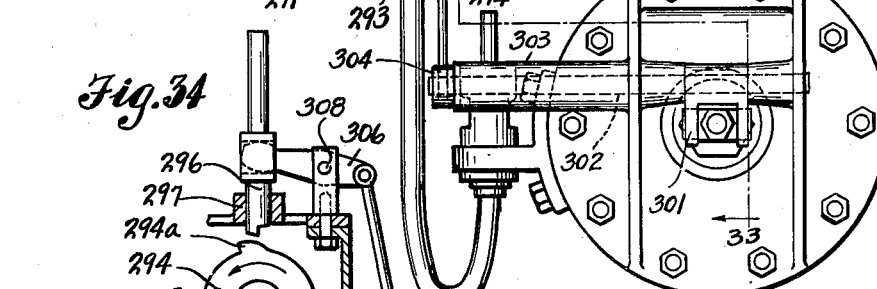
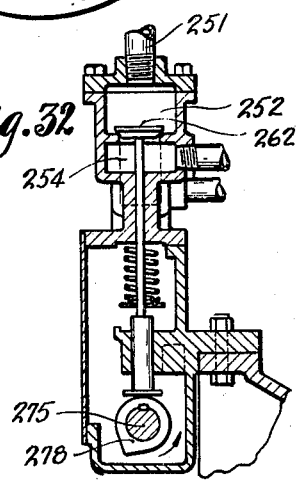
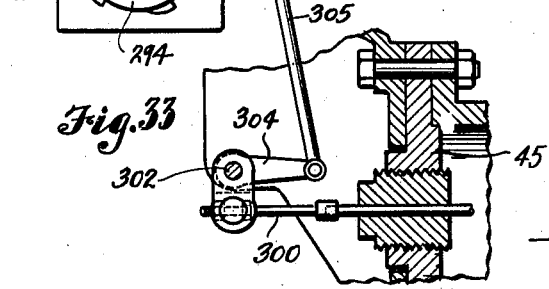
INVENTOR.
WORTH C. GOSS
BY
Cook & Robinson ATTORNEYS.

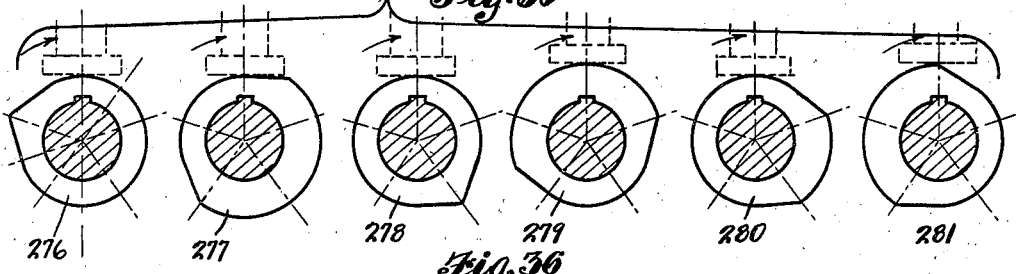
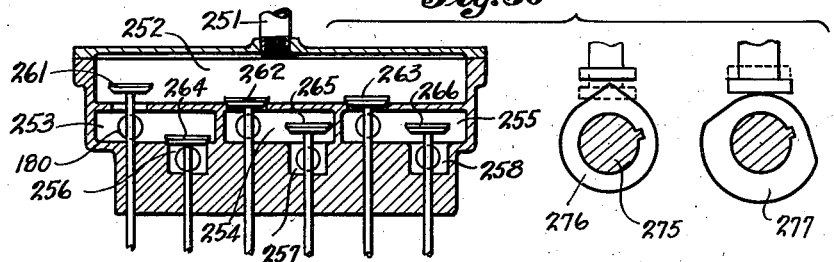
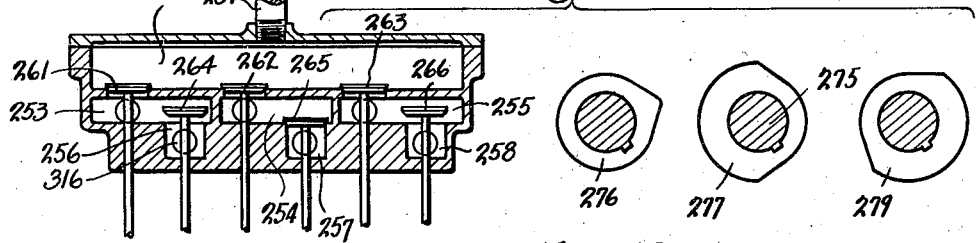
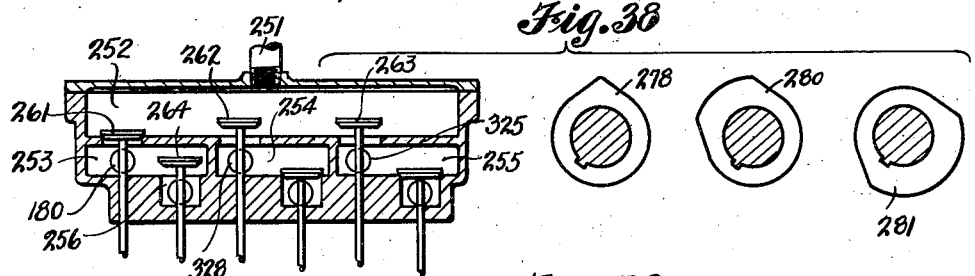
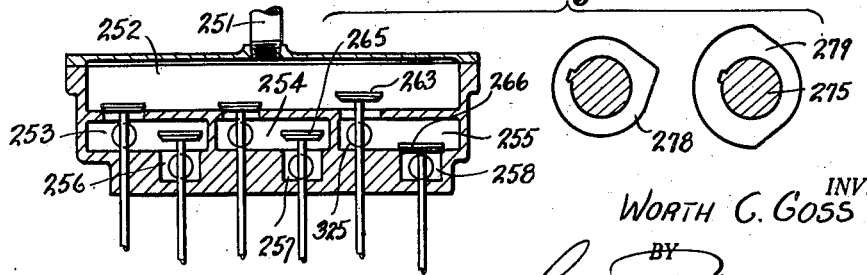

Aug. 30, 1938.    W. C. GOSS    2,128,241
BRIQUETTE PRESS
Filed Jan. 4, 1936    25 Sheets-Sheet 18
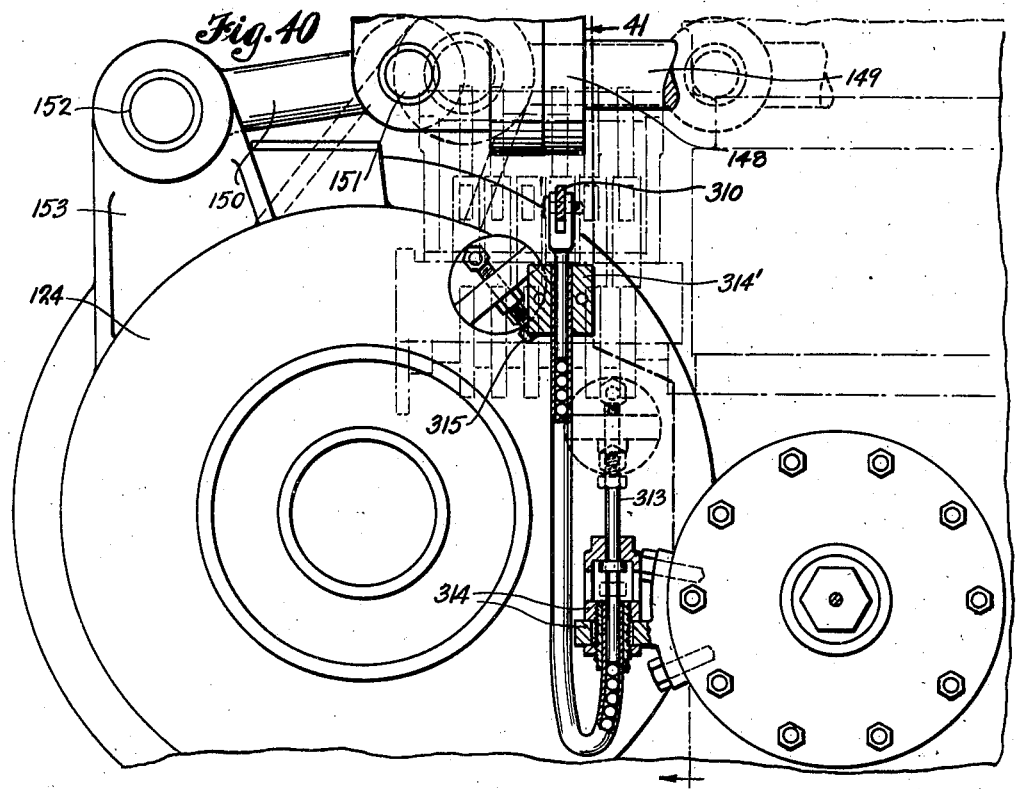
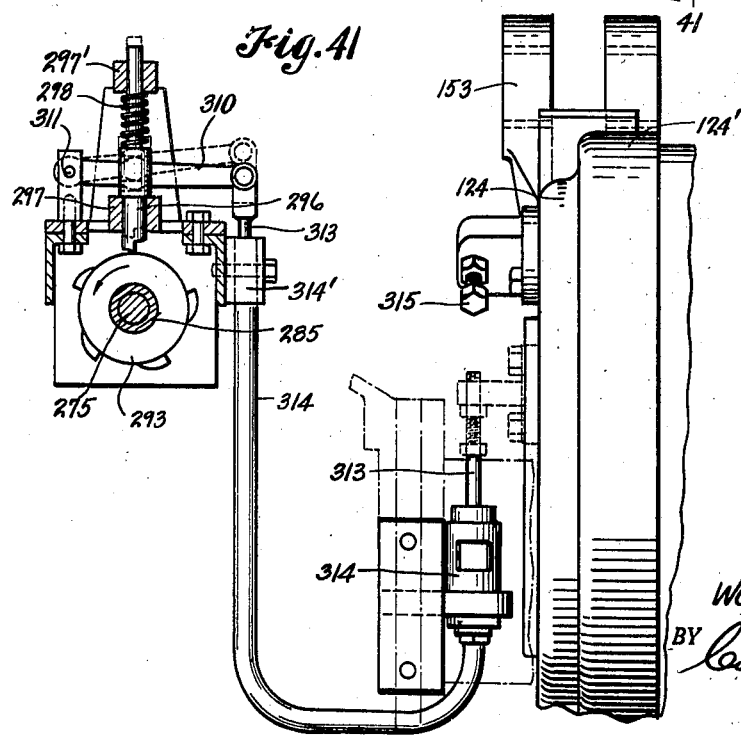
INVENTOR.
WORTH C. GOSS
BY Cook & Robinson
ATTORNEYS.

Aug. 30, 1938.  W. C. GOSS  2,128,241
BRIQUETTE PRESS
Filed Jan. 4, 1936   25 Sheets-Sheet 19
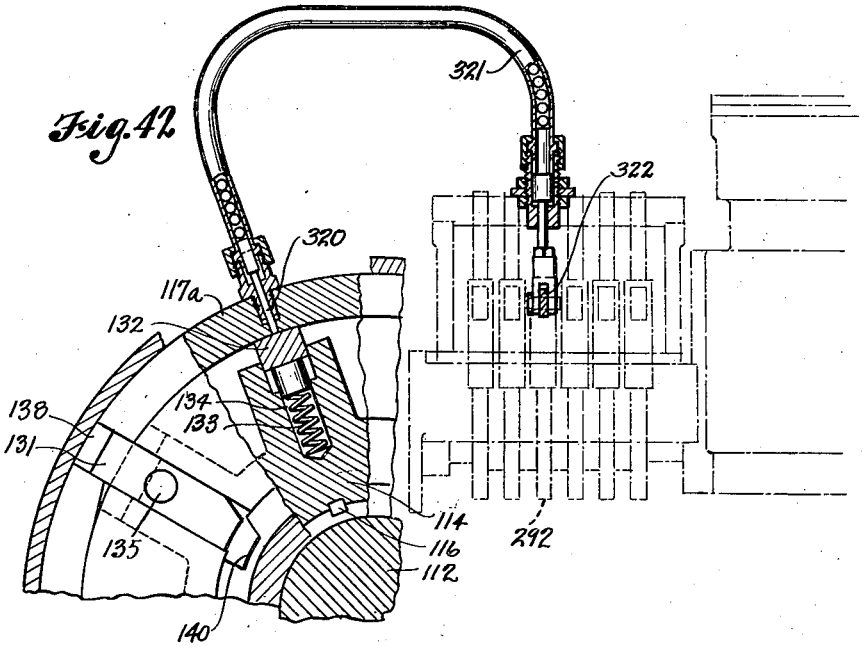
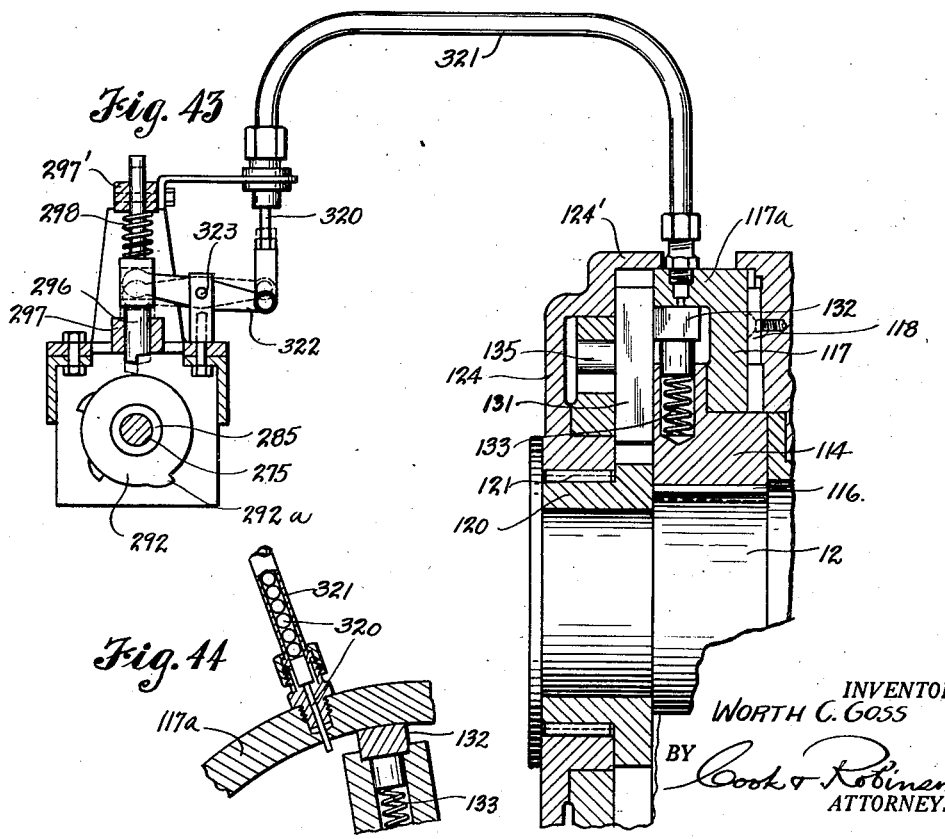
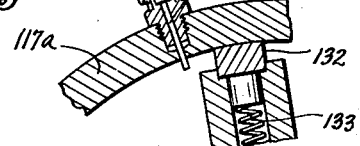
INVENTOR.
WORTH C. GOSS
BY Cook & Robinson
ATTORNEYS.

Aug. 30, 1938.  W. C. GOSS  2,128,241
BRIQUETTE PRESS
Filed Jan. 4, 1936   25 Sheets-Sheet 20
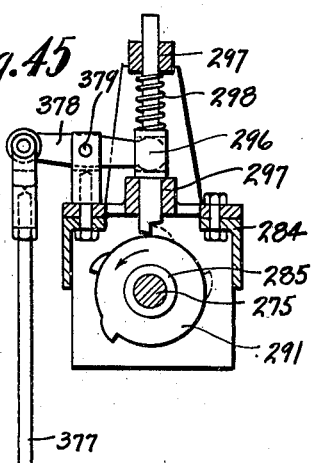
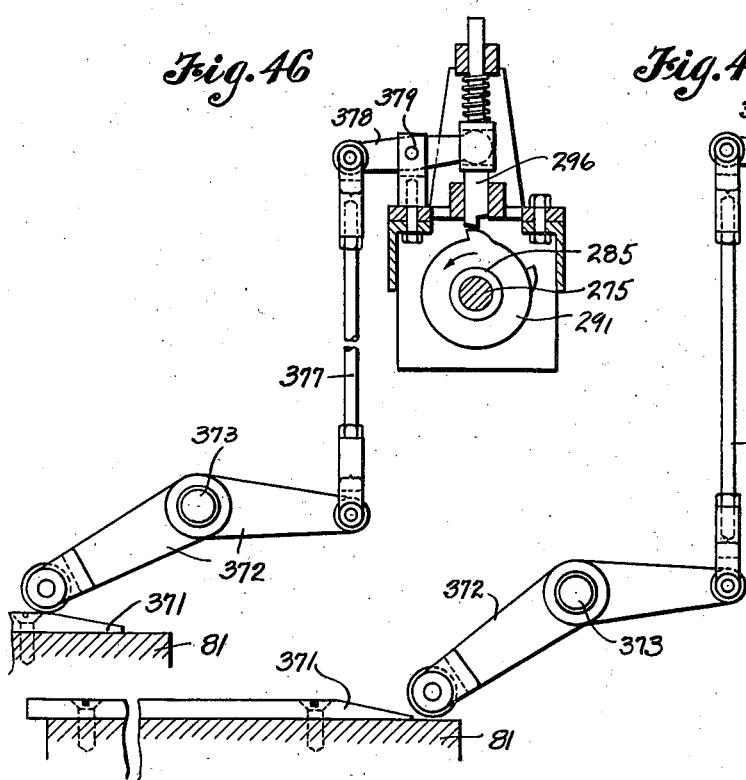
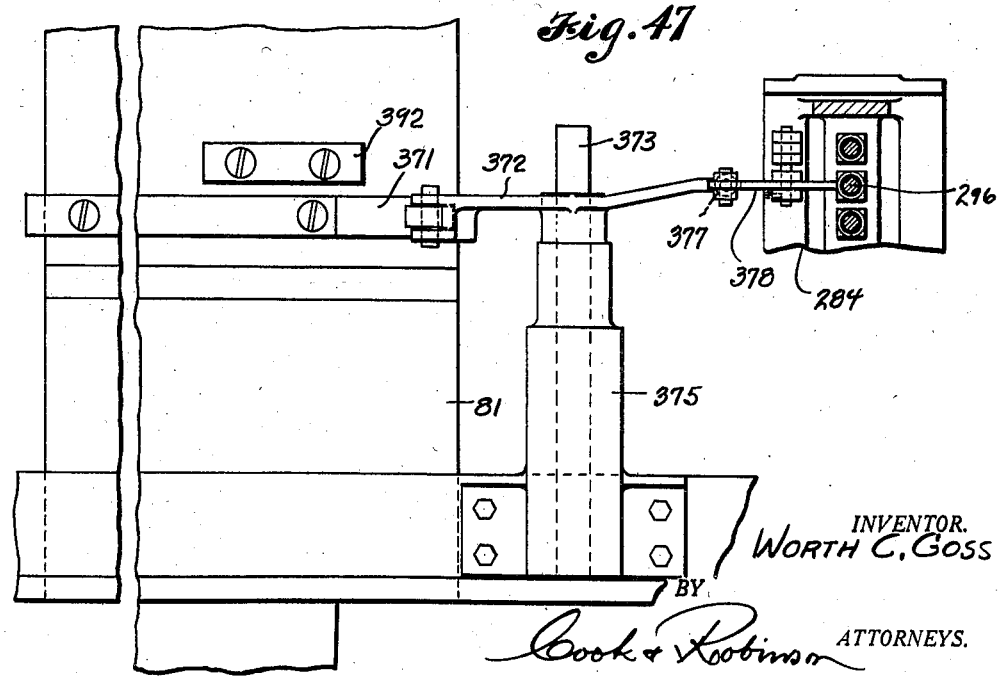
INVENTOR.
WORTH C. GOSS
BY
Cook & Robinson
ATTORNEYS.

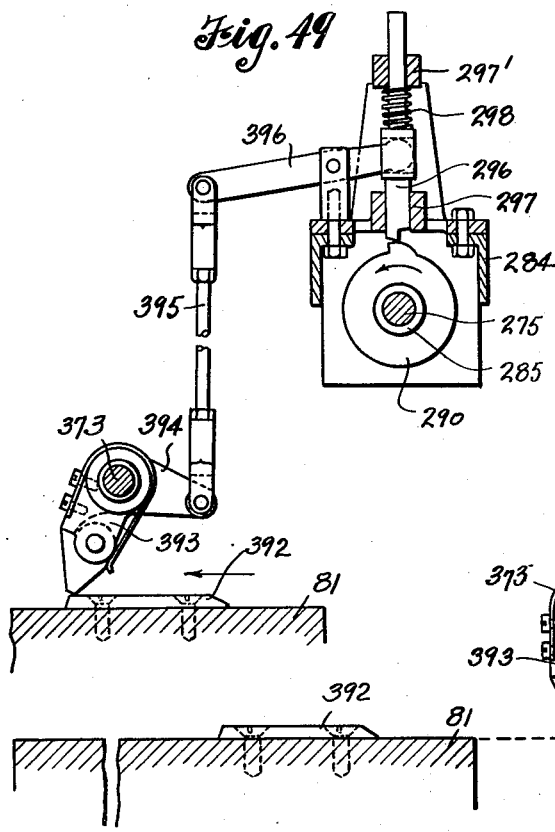
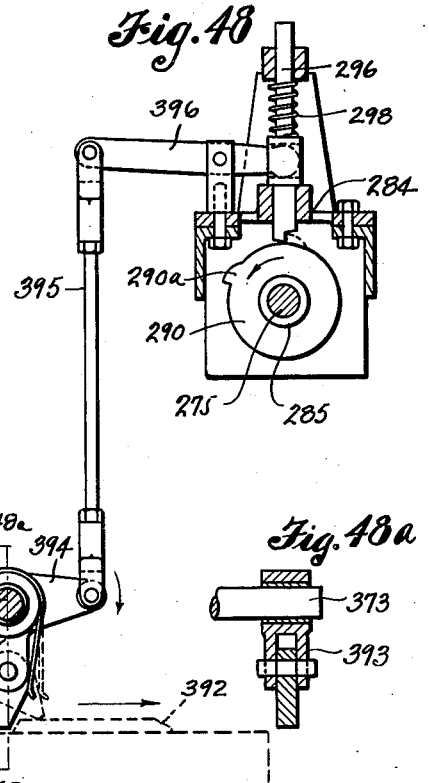
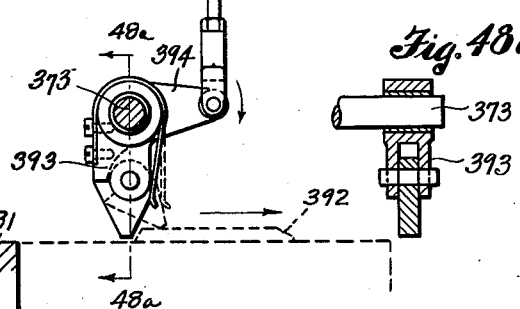
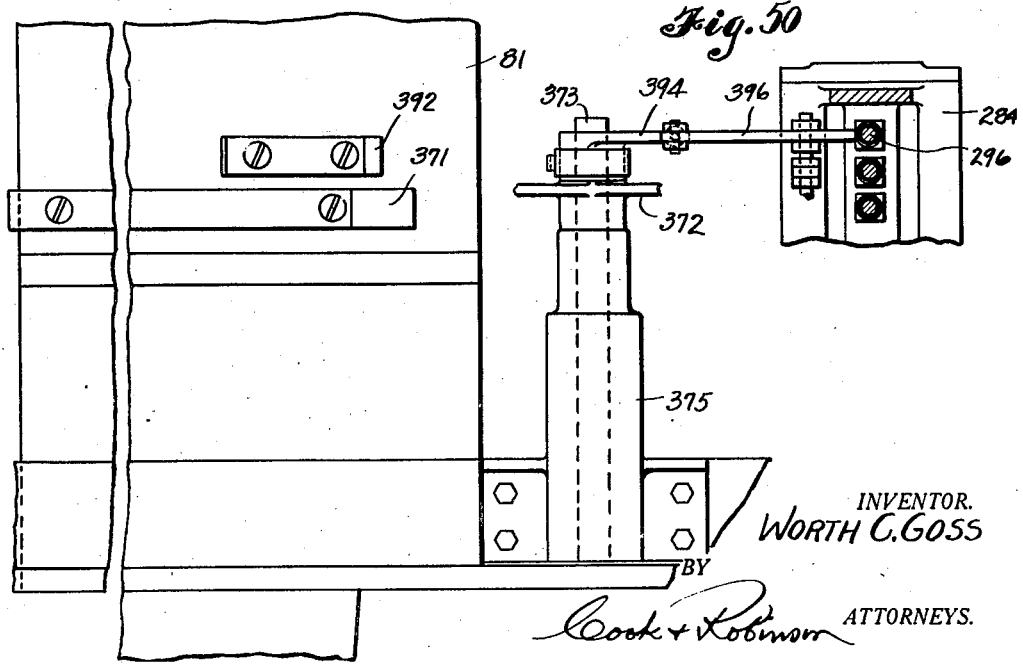

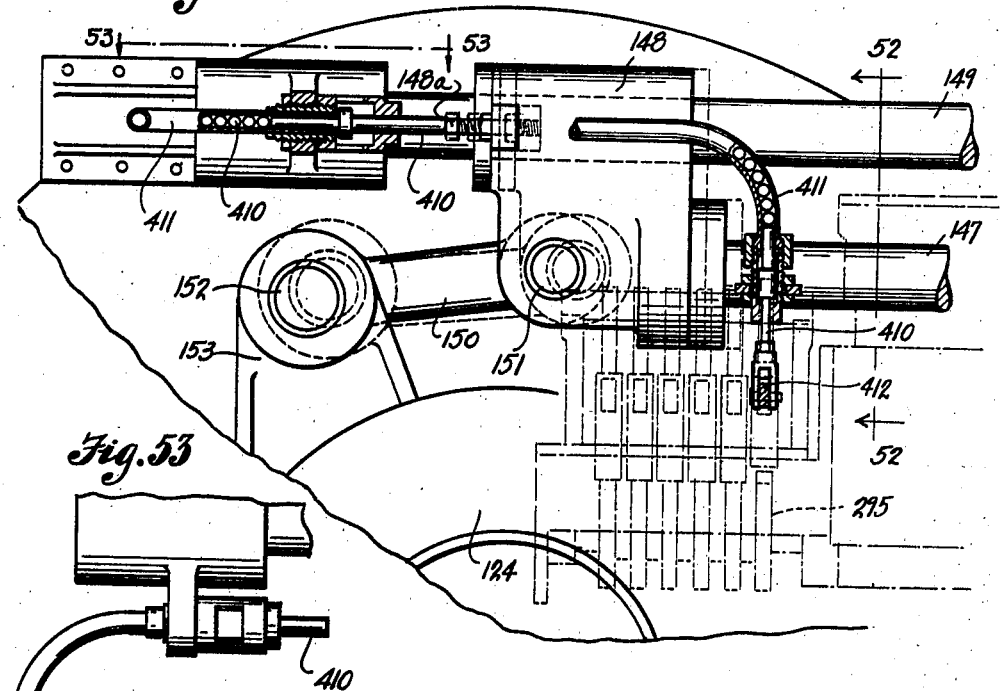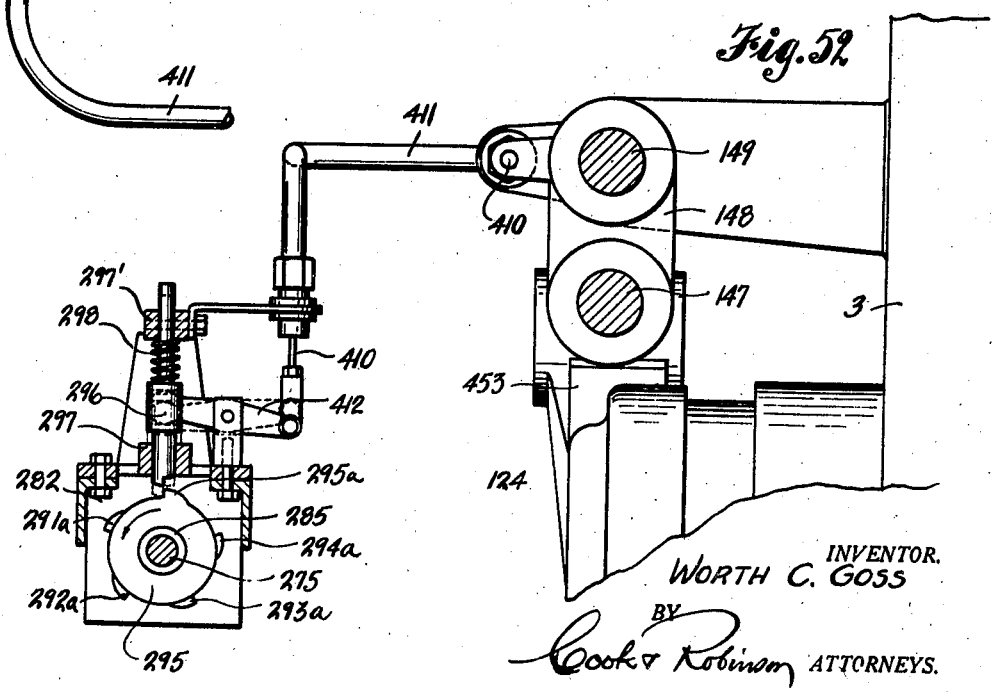

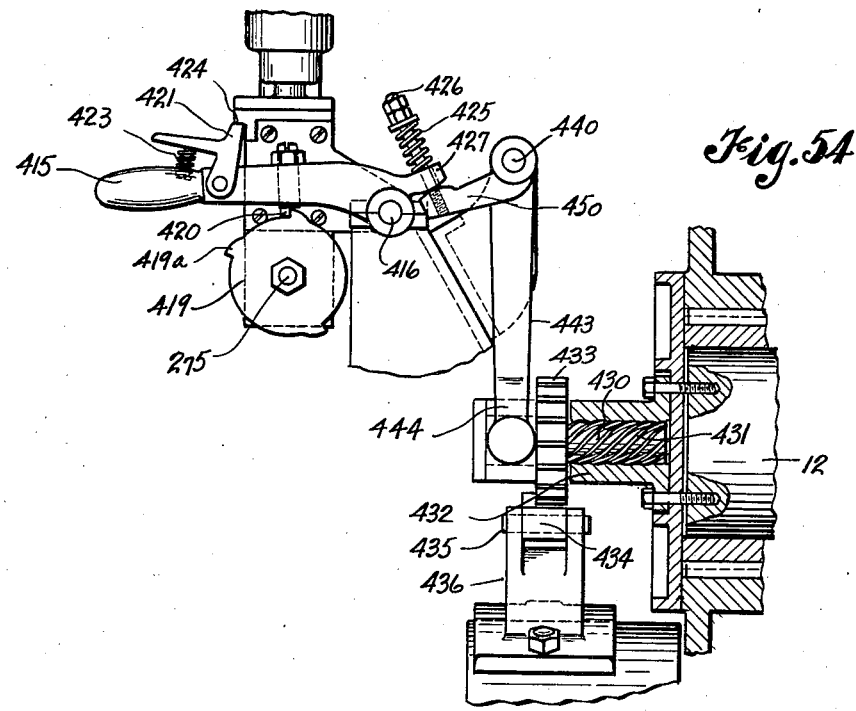
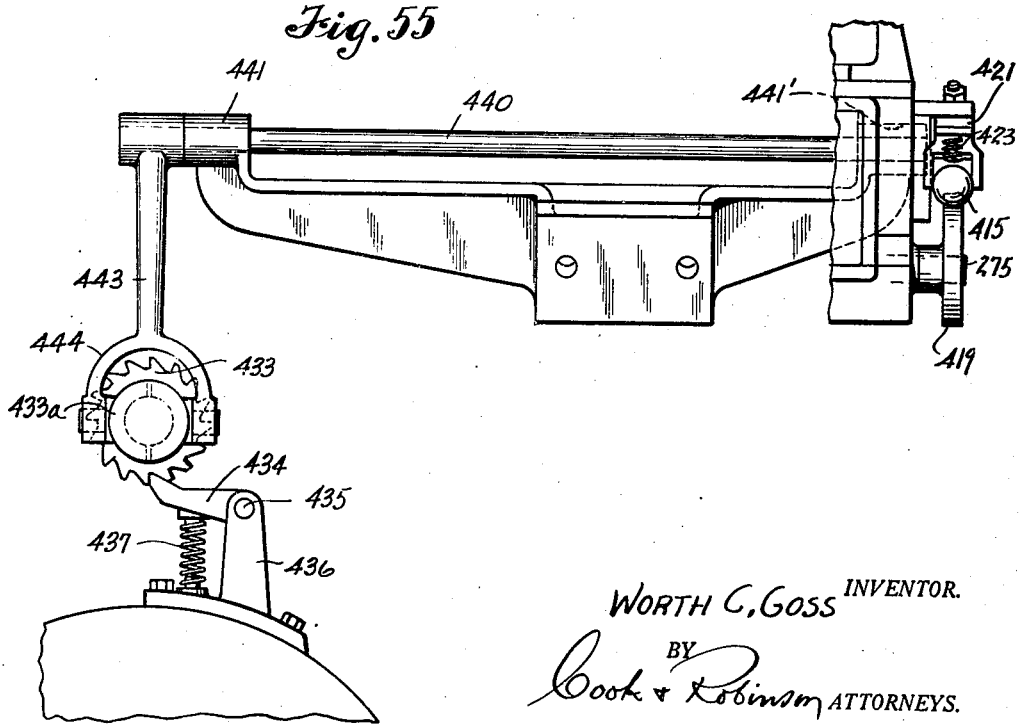

Aug. 30, 1938.    W. C. GOSS    2,128,241
BRIQUETTE PRESS
Filed Jan. 4, 1936    25 Sheets-Sheet 24

INVENTOR.
WORTH C. GOSS
BY
Cook & Robinson ATTORNEYS.

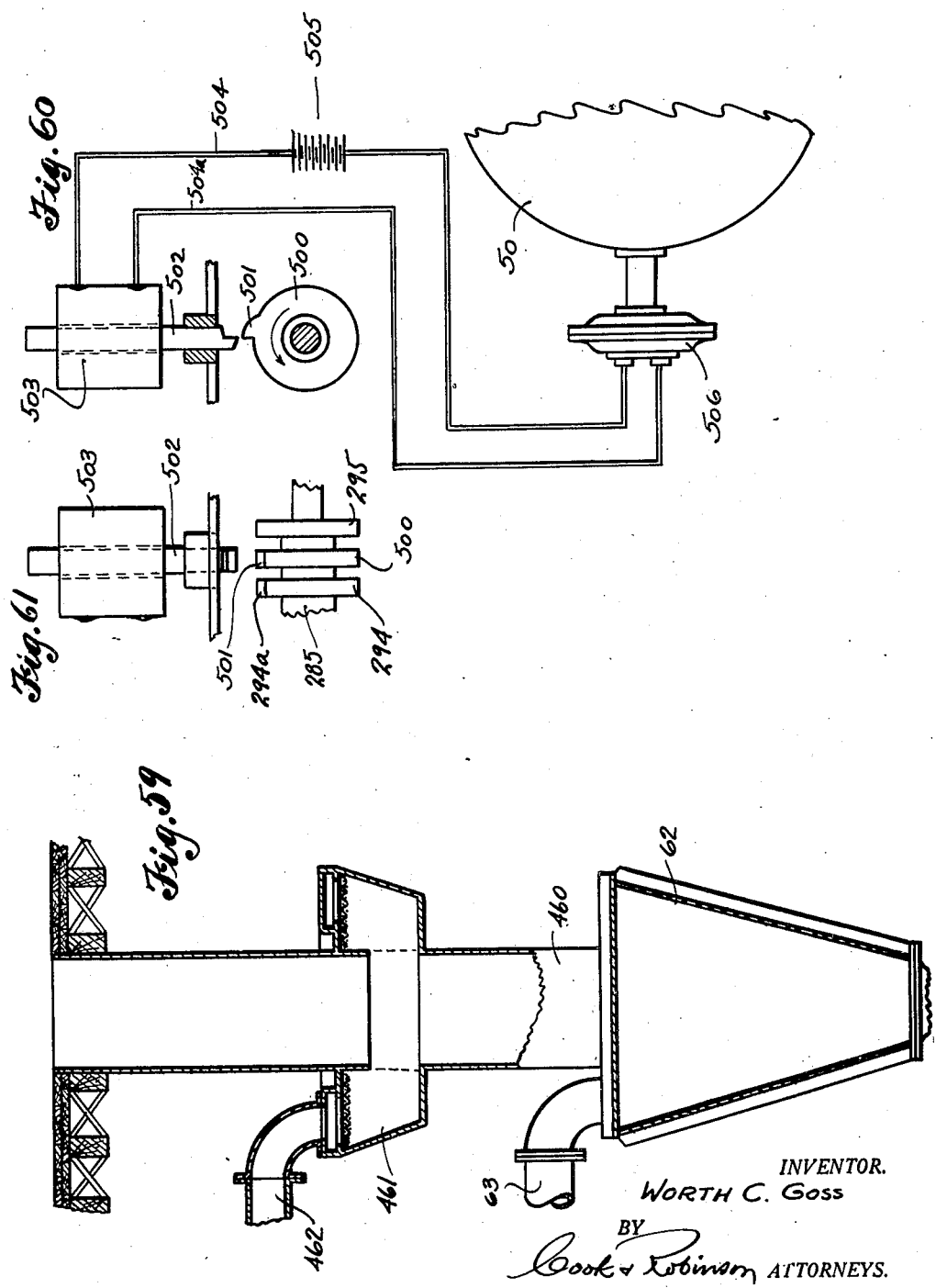

UNITED STATES PATENT OFFICE 2,128,241

BRIQUETTE PRESS

Worth C. Goss, Seattle, Wash., assignor to Carlisle Lumber Company, Onalaska, Wash.

Application January 4, 1936, Serial No. 57,546

15 Claims. (Cl. 25—12)

This invention relates to impact presses, and more particularly to a machine for the manufacture of briquettes from comminuted wood material, such as saw dust, chips, bark, hogged fuel, and the like, after the material has been reduced to a predetermined degree of fineness and moisture content.

It is the principal object of this invention to provide a machine for the manufacture of briquettes which is fully automatic in its operation, which in this art is considered a high speed machine, and whereby the prepared material is formed into briquettes by impact as differentiated from formation by a gradual compression and relatively slow operation, as, for example, in the action of the machine of the copending application of Oliver P. M. Goss and Worth C. Goss, filed Sept. 19, 1934, Serial No. 744,648, entitled Briquette machine.

In the course of intensive experimental work pertaining to briquette manufacture, especially in the manufacture of briquettes from comminuted wood waste materials, it has been determined that a better briquette, judged from the standpoint of durability in handling or storage, and also in burning quality, will be produced when the material is compressed into briquettes formed by sudden impact rather than by a slower application of an equal compressive force. The theoretical reason therefor is that the sudden impact results in the formation of the maximum of longitudinal ties in the finished briquette, in the form of small sticks and slivers which will actually be driven through each other by impact but not by a slowly applied force. This is due to the fact that twice the load (approximately) is required to crush a stick under impact as compared to static load. Thus a briquette that is more compact and which will burn with greater solidarity is formed, which also remains intact until completely consumed. In view of knowledge gained in past experiments and resultant to the actual manufacture of briquettes from wood waste material, it has been the principal object of the present invention to provide a machine that is designed for the commercial manufacture of briquettes of approximately two pounds' weight by impact under a pressure of substantially 40,000 to 60,000 pounds per square inch, and at an approximate rate of two briquettes per second; furthermore, to provide a machine that will produce briquettes of uniform size and weight.

More specifically stated the objects of the present invention reside in the provision of a machine wherein a plurality of briquette shaping dies are arranged in a rotary, intermittently advanced indexing wheel, and means provided at one station for loading the dies; with opposedly acting punches at another station for compressing the charges in the dies and means operable at still another station to deliver the formed briquettes from the dies; the advancement of the indexing wheel being under control of an indexing mechanism of novel character which, through the mediacy of safety devices, insures an accurate registration of the dies with the path of travel of the punches before the latter are permitted to deliver their impact stroke.

Other objects of the invention reside in the provision of means operating in conjunction with the material supply hopper and indexing wheel housing whereby substantially all air is extracted from the material entering the dies insuring that the briquettes will be formed in vacuum and that the density of the finished article will not be decreased or the durability will not be impaired by reason of faults or voids formed by entrapped air.

Still further objects of the invention reside in the details of construction, in the combination of parts, and in their mode of operation, particularly with reference to sequence, as will hereinafter be fully described.

In accomplishing these, and other objects of the invention, I have provided the improved details of construction, the preferred forms of which are illustrated in the accompanying drawings wherein—

Fig. 1 is a side view of a briquette forming impact machine embodying the present invention.

Fig. 2 is a top, or plan, view of the machine with the material supply hopper removed for purpose of better illustration of parts otherwise obscured.

Fig. 2a is a sectional detail of the ejector ram as seen on line 2a—2a in Fig. 2.

Fig. 3 is an enlarged, sectional view in a vertical plane lengthwise of the machine and axially of the main power cylinder.

Fig. 4 is an enlarged sectional view in a vertical plane lengthwise of the machine, showing the hydraulic locking means whereby the impact punches are held against possible delivery of an impact stroke until the registeration and locking of the indexing wheel has been completed.

Fig. 5 is a sectional view of a part of the machine as seen in a vertical plane axially of the mold charging cylinder and ram.

Fig. 6 is a sectional view in a horizontal plane of the mold charging cylinder and ram.

Fig. 7 is a view illustrating a detail of the mold charging ram.

Fig. 8 is a side view of the feed hopper and vacuumizing chambers.

Fig. 9 is a sectional view of the hopper as seen on line 9—9 in Fig. 8, showing the series of hopper chambers for the progressive vacuumization of the material.

Fig. 10 is a cross sectional view in a vertical plane on the line 10—10 in Fig. 1 showing the indexing cylinder in longitudinal section.

Fig. 10a is a cross sectional detail on the line 10a—10a in Fig. 10.

Fig. 13 is a cross sectional view of the indexing means as viewed on the line 13—13 in Fig. 11, particularly illustrating the locking bolts.

Fig. 14 is a cross sectional detail of the same parts shown in a farther advanced position of the indexing means.

Fig. 14a is a perspective, illustrating detail of a locking bolt.

Fig. 15 is a sectional view of the main power cylinder with the piston retracted, and showing the control valve for the cylinder.

Fig. 16 is a sectional detail of the valve shifting means associated with the main power cylinder.

Fig. 17 is a cross sectional detail on line 17—17 in Fig. 16.

Fig. 18 is a plan view of the cam control system for the steam valve.

Fig. 19 is a longitudinal, vertical section taken on line 19—19 in Fig. 18.

Fig. 19a is a plan or top view of the cam actuated rocker head for actuating the steam valve.

Fig. 20 is a cross section on the line 20—20 in Fig. 18.

Fig. 21 is a sectional detail of the main power cylinder showing the position of the steam valve and piston for one certain cam position.

Fig. 22 is a plan view showing relative positions of the rocker head rollers and the control cams in the position corresponding to the showing of these parts in Fig. 21.

Fig. 23 is a perspective view of a stationary cam which actuates one of the laterally shiftable cams.

Fig. 24 is a side view of the control cam system and valve actuating rocker head as positioned at the end of a power stroke.

Fig. 25 is a plan view showing the relative position of parts of the rocker head rollers and cam system, corresponding to the showing in Fig. 24.

Fig. 26 is a side view of the rocker head rollers and cams at a period during the return stroke of the power piston.

Fig. 27 is a plan view showing the position of the same parts corresponding to their showing in Fig. 26.

Fig. 28 is a sectional detail, in a central longitudinal plane of the machine, of the hydraulic valve means for locking the hammers in retracted position.

Fig. 29 is a cross sectional detail on line 29—29 in Fig. 28.

Fig. 30 is an enlarged sectional detail of the over travel compensating valve of the hydraulic locking means.

Fig. 31 is a longitudinal sectional detail, in a vertical plane, of the master control system as on line 31—31 in Fig. 1.

Fig. 32 is a cross section on the line 32—32 in Fig. 31.

Fig. 33 is a cross section on line 33—33 in Fig. 31.

Fig. 34 is a similar view of the parts shown in Fig. 33 in "release" position.

Fig. 35 is a view diagrammatically showing relative positions of the series of cams on the cam shaft of the master control system.

Fig. 36 is a sectional detail showing relative position of the valves of the control system at the time of effecting an indexing operation, and showing the relative position of cams for actuating the valves which control the indexing operation.

Fig. 37 is a similar view showing the relative position of valves and cams for returning the indexing ratchet.

Fig. 38 is another view of the same parts showing the relative positions of the valves and control cams whereby the steam control valve of the main power cylinder and the hydraulic lock valve of the power piston are released.

Fig. 39 is a similar diagrammatic illustration of the valve parts in position for closing the main steam valve and for opening the exhaust valve for steam from the main cylinder.

Fig. 40 is a detail illustrating actuation of parts permitting the indexing return strokes.

Fig. 41 is a cross section on the line 41—41 in Fig. 40.

Fig. 42 is a sectional detail illustrating the means under control of indexing disk lock bolt for effecting an actuation of the main steam control valve.

Fig. 43 is a sectional detail illustrating actuation of the release ratchet by the locking bolt of the indexing mechanism.

Fig. 44 is a fragmentary detail of the release mechanism.

Fig. 45 is a detail illustrating means for controlling the release of a ratchet of the master control that will permit exhaustion of the main steam cylinder.

Fig. 46 is a similar view after actuation.

Fig. 47 is a plan view of the same parts.

Figs. 48 and 49 show, in sectional detail, before and after actuation, respectively, the ratchet control devices for closing air to hydraulic lock valve and for opening the steam cylinder to exhaust.

Fig. 50 is a plan view of the same parts.

Fig. 51 is a detail of parts for assuring complete return of the indexing means before a following operation can take place.

Fig. 52 is a sectional view on the line 52—52 in Fig. 51.

Fig. 53 is a plan of parts as seen on line 53—53 in Fig. 51.

Fig. 54 is a detail of the safety device which operates to stop the machine incident to reverse rotation of the indexing wheel.

Fig. 55 is an end, or face, view of the parts shown in Fig. 54.

Fig. 59 is a detail illustrating an alternative means for feeding comminuted material under vacuum into the machine.

Fig. 60 is a view diagrammatically illustrating a supplemental safety device utilized in the control of the machine.

Fig. 61 is a detail of the same.

Figure 11:
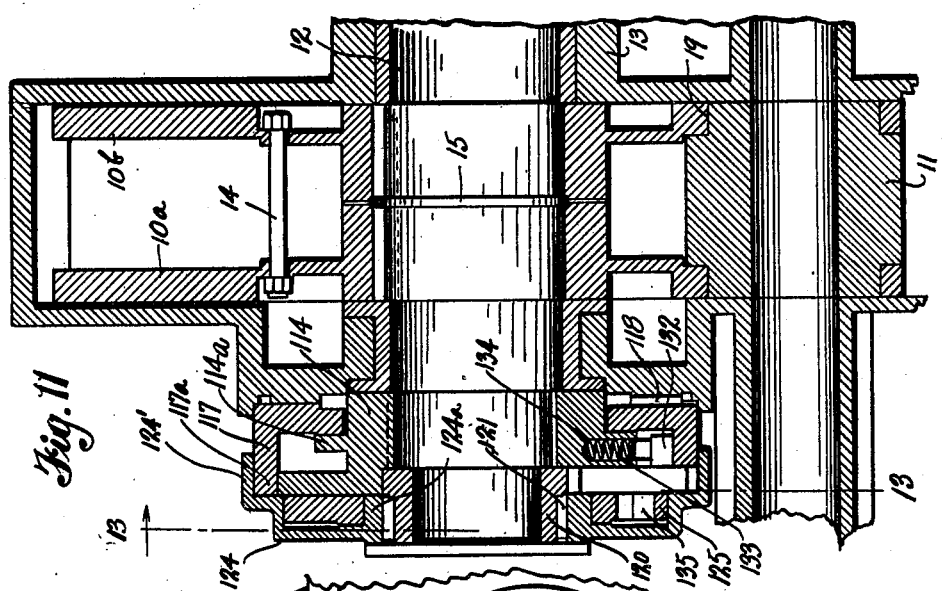
Fig. 11 is a sectional detail of the indexing wheel as seen in its vertical axial plane.
Figure 12:
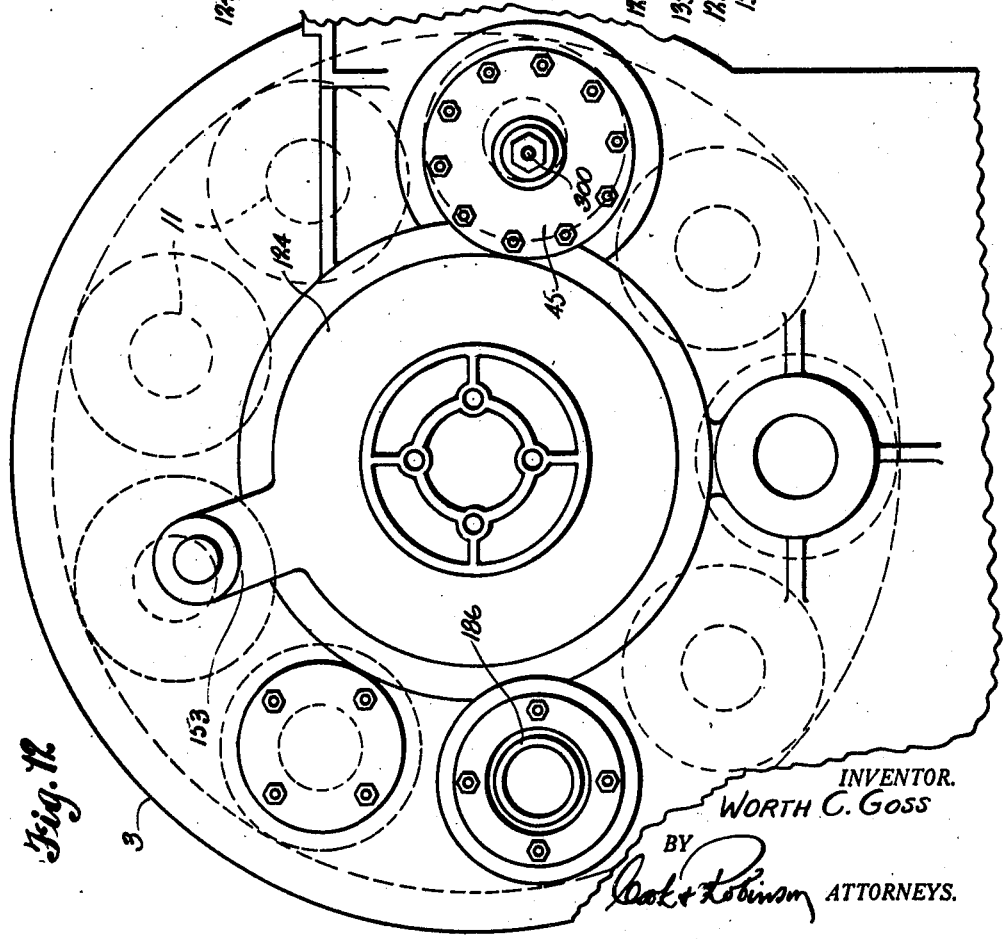
Fig. 12 is a face, or end, view of the indexing means.
Figure 56:
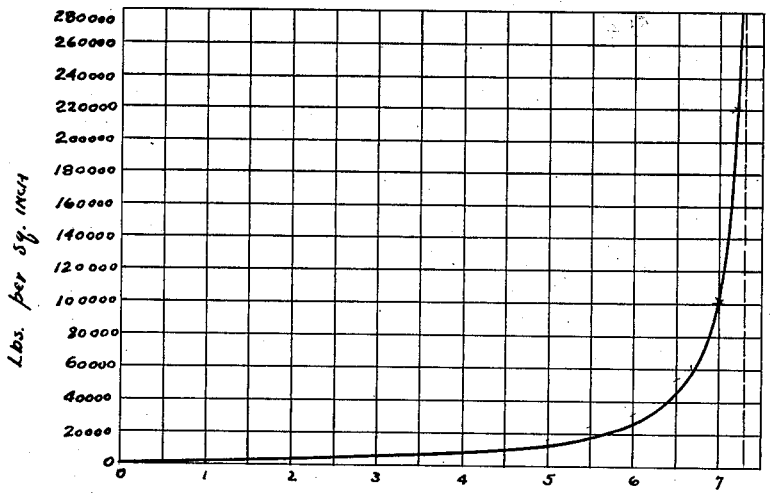
Fig. 56 is a graph of the pressure curve.
Figure 57:
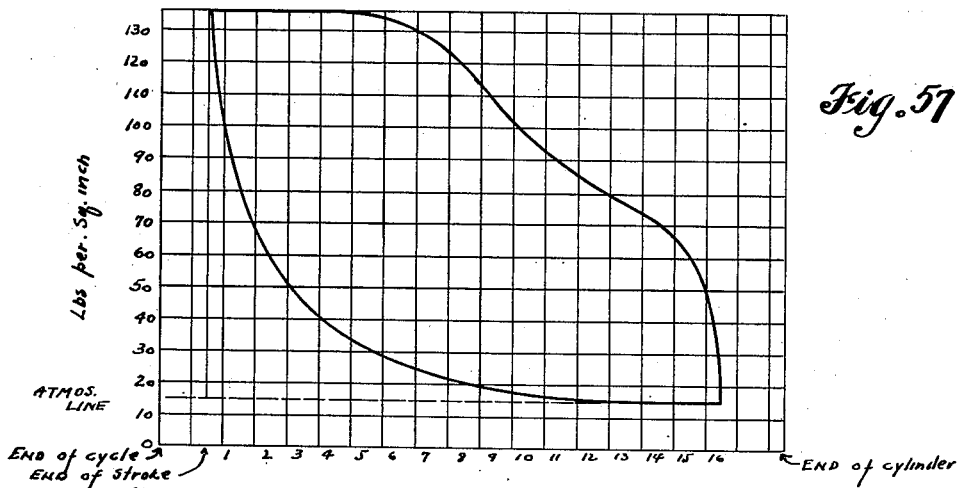
Fig. 57 is an indicator diagram for the steam cylinder.
Figure 58:
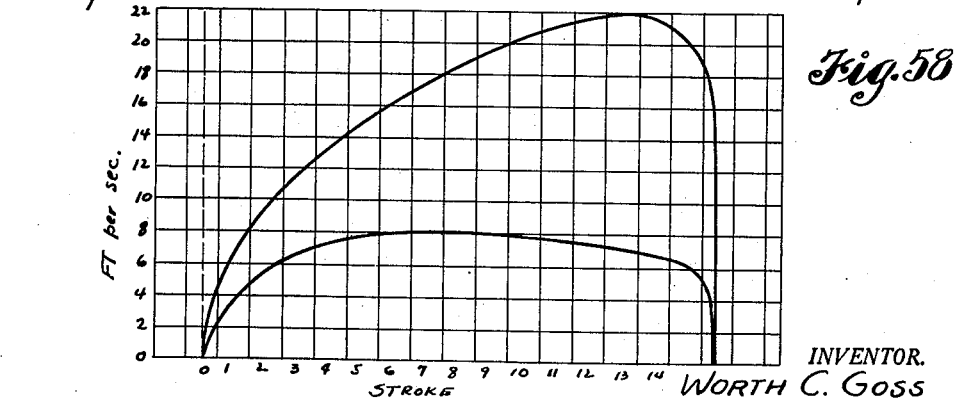
Fig. 58 is a chart showing the velocity curves for the punches.

The construction and mode of operation of the present machine, briefly described, is as follows:

Rotatably mounted within the machine is a wheel in which a plurality of dies are supported. An indexing mechanism operates to intermittently rotatably advance the wheel, thereby to bring the dies successively to the "loading", "forming" and "discharging" stations. The material from which the briquettes are to be formed is delivered from a source of supply to a vacuumizing chamber. The material, completely vacuumized, is fed from the chamber by means of a loading ram, into the dies as they successively are brought to the loading station. Each die, after being loaded, is indexed to the forming station, and there registered with the path of travel of a pair of punches which enter the die simultaneously from opposite ends to compress the material into a solid briquette. The wheel then advances to the ejection position and the formed briquette is discharged. The punches are actuated by power transmitted through a steam cylinder piston and suitable connections. The feeding of material to the dies, the actuation of the punches, the indexing and the ejection of the finished briquettes is effected by means all under control of a master control system which causes the various operations to take place in proper sequence. The starting of each cycle of operation, however, is under control of the die loading mechanism, thereby to insure that the cycle will not start until after the die has been properly charged.

The master control system then operates to insure a complete cycle of operations; then stops the machine until released by the die loading means.

Referring more in detail to the drawings—

The base of the machine comprises two parallel, spaced I-beams 1 and 1' of sufficient strength and dimensions to serve their intended purpose. These beams are joined and are sustained in proper relation by a plurality of cross tie bolts 2 extended through their web portions, and additionally by the power cylinders that are secured thereon at the opposite ends of the machine and the indexing wheel housing secured to the beams at a medial point.

The indexing wheel housing 3 is substantially of circular form and is disposed in a vertical plane transversely of the base beams with its axial line lengthwise of the base. At its opposite sides, this housing is formed with supporting brackets 4—4 which rest upon the base beams and are securely bolted thereto. The main part of the housing 3 is located above the base beams, but it has a chambered portion 6 continuing down between the beams 1 and 1', forming a trap for waste material from the dies. This trap has a suitable clean out, as shown at 7 in Fig. 3.

The housing 3 contains therein the indexing wheel 10, which is fitted with the briquette shaping dies 11. This wheel is supported by means of its shaft 12 which in turn is revolubly journaled in bearings 13—13 in opposite side walls of the housing. As shown best in Figs. 3 and 4, the indexing wheel is divided centrally in a plane perpendicular to its axis, thus to form two opposite side sections, designated respectively by reference characters 10a and 10b, which, after being slipped onto the shaft 12 from its opposite ends, are bolted together by a plurality of tie bolts 14. The supporting shaft has an encircling abutment collar 15 formed thereon and the hub portions of these two sections of the wheel are drawn against its opposite sides, thereby to hold the wheel against longitudinal shifting relative to the shaft. A key 16 locks the wheel against rotation on the shaft.

The two complemental sections forming the indexing wheel are spaced apart, and between them are mounted the briquette forming dies 11; there being nine dies in the present machine and they are arranged about the axis of rotation of the wheel, equally spaced apart and at equal distances from the axial center. Each die, as will be observed by reference to Fig. 11, is of cylindrical form, disposed axially parallel with the axis of the wheel and has its opposite end portions diametrically reduced and fitted in openings 19 in the wheel plates; the ends of the die being flush with the outside surfaces of the wheel, and the die passage is slightly tapered toward the entrance end.

The briquettes are formed by the compression of material in the dies following their being successively brought into registration with a pair of reciprocally and opposedly acting impact punches which enter the registered die simultaneously from its opposite ends. The means for feeding the material into the dies is illustrated best in Figs. 5 and 6 and it comprises the following parts: At the location on the indexing wheel housing selected as the loading station, is a laterally extending cylindrical neck 24 to which a hopper base 25 is secured by bolts 26. The hopper base is of one piece construction and is formed with a downwardly tapered outlet 27 leading into a tubular portion 28 that is axially alined with the neck 24 to which it is bolted. A cylindrical sleeve 29, slightly tapered toward the die, is fitted within the parts 24 and 28, and in the top side of its outer end portion, has an opening 30 through which material is received thereinto from the hopper base. The inner end of the sleeve opens through the indexing wheel housing 3 at a location at which the forming dies register axially therewith as they are successively advanced to the loading station.

Reciprocally contained in the tubular sleeve 29 is one end of a loading ram 32 which is operatively connected at its outer end with a piston 33. The piston 33 is reciprocally fitted in a closed cylinder 34 which, in turn, is reciprocally movable in an open cylinder 35 fixedly mounted on the machine base. The cylinder 34 is connected at its outer end by means of a piston or connecting rod 36, with a counterbalanced crank arm 37 on a rotatably driven shaft 38. Shaft 38 is disposed transversely of the longitudinal line of the machine and is connected through a suitable gear reduction means, as designated at 39 in Fig. 2, with the driving shaft 40 of an electric motor 41. Air under pressure is maintained in the closed cylinder 34 to normally retain piston 33 in position therein that the ram is fully extended. However, the air cushion in cylinder 34 acts as a shock absorber and also permits the ram to yield in accordance with the filling of the die; it being understood that the ram is reciprocated at quite a high rate, and that in its reciprocal travel outwardly, it uncovers the opening 30 and material is fed from the hopper into the sleeve 29. Then, when the ram is moved forwardly, it pushes this material forwardly into the die. The extent of the reciprocal action of the cylinder 34 is constant, but the travel of the ram is shortened incident to the filling of the die. Therefore, the connection of the ram and cylinder 34 must be yieldable.

The air pressure is maintained in cylinder 34 through a pipe connection 48. This pipe, as shown in Fig. 6, has one end threaded into the cylinder end wall and its other end is reciprocally contained in a manifold 49 which is supplied with air under pressure in a storage tank 50 through a pipe connection, as designated at 51 in Figs. 2 and 6.

During the loading of a die, the end that is opposite that which receives the material, is closed by a closure plug 42. This plug is fitted in a guide housing 43, see Fig. 5, formed integral with the housing 3. A cylindrical housing 45 is bolted to the housing 43 as a coaxial extension and this contains a coiled spring 46 which bears inwardly against the closure plug to normally maintain the flat inner end of the latter flush with the adjacent end of the die. When the material has been packed into the die by the reciprocal action of the punch to a pressure which will overcome the holding force of the coiled spring 46, the plug will then move outwardly and this movement will effect the starting of a cycle of operations, presently described, the first of which operations is the forward indexing of the wheel 10.

It will be observed by reference to Figs. 6 and 7 that the outer end portion of the ram is of tubular form and is coaxial of and is revolubly fitted on a shank 53 of the inner end portion; the two parts having a lost motion connection provided in a pin and slot connection, as at 54 in Fig. 7, wherein the slot extends in a diagonal direction. Also, it is observed that the end face of the ram is toothed as at 55. Thus, incident to each retractive movement of the cylinder 34 the outer end portion of the ram will be given a slight rotative movement which will operate to loosen the packed material in contact with the teeth 55, so that the next charge that is packed into the die will be united with that previously loaded in without stratification.

In Figs. 8 and 9, I have illustrated the vacuumization supply hoppers for the comminuted material that is to be delivered into the machine. In a construction which is now found to be satisfactory, there are three vacuumizing chambers 60, 61 and 62, arranged in order, one above the other, and each having a pipe connection 63 with a controlled source of vacuum, whereby the chambers, in the order numbered, are maintained under vacuum of approximately 16 inches, 26 inches, and 29 inches, or greater.

The three chambers are separated, one from the other, by slide valves 65 which are opened as required for the feeding of material from one chamber to the other, for a progressive vacuumization of material. The procedure is to admit material by gravity flow from a suitable source of supply into the uppermost chamber 60 for the initial vacuumization. Then, with the uppermost valve 65 closed, the second valve 65, between the chamber 60 and 61, is opened to permit the partly vacuumized charge to be delivered into the chamber 61. Then, with the valve plate between the chambers 60 and 61 closed, the valve 65 into the chamber 62 is opened and the material is delivered into the latter chamber for its final vacuumization.

It is the intention that the operation be automatically controlled so that the uppermost valve 65 closes prior to the opening of the next lower valve so that the vacuum at no time will be broken, and that charges follow in succession from chamber to chamber.

The outlet from the chamber 62 opens into the hopper base 25 and the vacuumized material is fed into the latter as needed by means of a vertically reciprocating packer 66, best illustrated in Fig. 9. The packer is supported by a vertical rod 66a slidable through a packed guide 67 in the chamber wall and operatively connected with a piston 68 connected to a crank arm 69 revolubly supported by a bracket 70. A sprocket wheel 71 is fixed on the shaft of the crank arm and is driven by a sprocket chain belt 72 running over a sprocket wheel 73 on the motor driven crank shaft 38. By reference to Fig. 9 it will be observed that the pitman connects with a slide 74 on rod 66a and on its upstroke engages a stop collar 74a fixed on the rod, while a coiled spring 75 is disposed about the rod against a supporting collar 75a to bear upwardly against the slide. This provides a yielding action of the packer 66.

It is intended that the slide valves 65 shall be automatically actuated, and, as a part of the actuation means, I have illustrated each as being equipped with an air cylinder 76, and in each cylinder is a piston 76a connected by a rod 77 with its corresponding valve 65. Air is admitted into the cylinders under automatic control for actuating the pistons as needed to open or close the valves 65.

It will also be mentioned here that while I have shown the means for a progressive vacuumization, a satisfactory result may be obtained by eliminating the two upper chambers 60 and 61 and using only the lower compartment 62 and feeding material directly thereto for vacuumization through an elongated standpipe, such as illustrated in Fig. 59 later described.

Assuming that a die of the indexing wheel has received its charge of material and that the devices, later to be described have indexed the wheel one interval and thus located the filled die in registration with the line of travel of the impact punches, the punches then, in proper timing in the cycle of operations, are actuated simultaneously and with equal force into opposite ends of the die to compress the charge. The punch actuating means will now be described.

Referring to Figs. 1 to 4 inclusive, it is shown that, at opposite sides of the indexing wheel housing and mounted on the base structure, are cross head slides 80 in which cross heads 81 and 82 are contained for reciprocal movement directly from and toward each other. These cross heads, referred to hereinafter as hammers, weigh approximately one ton each and are disposed transversely of the frame structure and, respectively, have punches 83 and 84 fixed thereto. The punches are accurately axially alined and their inner end portions are reciprocally contained in guideways 85—86 that accurately register after an indexing operation of the wheel, with the opposite ends of the charged die in which the briquette is to be formed.

Figs. 3 and 4 show the hammers and punches retracted. When the hammers are actuated under the power stroke, the punches, near the end of the stroke, simultaneously enter the opposite ends of the die and the comminuted material therein is formed under their impact into a briquette. After another indexing operation the briquette is ejected, as will presently be described.

To insure a simultaneous and balanced cooperating action of the hammers 81 and 82, an operating connection between them is provided as shown in Figs. 1 and 2. This connection comprises at each side of the machine a rocker lever 88 pivotally mounted at its center to oscillate on a supporting stub shaft 89 fixed in the indexing wheel housing. Opposite ends of these levers are connected, respectively, by means of links or connecting rods 90—90 with pivot studs 91 in the ends of the hammers. Thus, the inward and outward reciprocal action of the two hammers of equal weight are coincident and the forces transmitted thereby are balanced.

The reciprocal action of the hammers is effected by an application of power through the mediacy of a steam cylinder 93 in which a piston 94, connected to the hammer 81 by a rod 95, is reciprocally contained. In Figs. 1 and 2, it is shown that the steam cylinder 93 is fixed by bolts 96 upon the left hand end of the base frame and that it is located with its axis in the central longitudinal plane of the machine. Also that the piston rod is fixed in the hammer, coaxially alined with the punch and it operates through a packed gland 98 in the cylinder head 99.

The admittance of steam into the main steam cylinder is under control of a steam valve 105, as shown in Fig. 15, and this valve is under automatic control of devices embodied in a master control system whereby a necessary and proper sequence of operations is insured. For the present, it will be stated that the valve 105 is reciprocally movable in a valve cylinder 106 and when at one end of its stroke, will admit steam from a source of supply into the cylinder to drive the piston inwardly on the impact stroke. In its opposite position, it permits exhaustion of this steam for return of the piston. As shown in Fig. 15, steam is admitted from a connection 107 from a source of supply to the valve cylinder through a port 108 and is admitted from the valve cylinder to the power cylinder through a port 109. Port 109 also is the exhaust port and, when the valve is in exhaust position, it provides for exhaust of steam from the valve cylinder through an end port 111. The valve 105 has an actuating rod 110 and this has operative connections, as shown in Fig. 16, with an actuating lever 112, mounted by a horizontal rocker shaft 113 which will be more fully described later in this specification.

Assuming that a charge of material has been loaded into one of the dies of the indexing wheel and that the compression of the charge under the reciprocal action of the loading ram 32 has caused a predetermined compression of the spring 46 resulting in the actuation of a certain member of the master control system, later to be described, which sets into motion the indexing devices; the indexing of the wheel to bring this charged die into registration with the impact punches is then effected by the following means, reference being had particularly to Figs. 11 to 14 inclusive:

As seen in Fig. 11, the indexing wheel shaft 12 has an end portion of reduced diameter extended from the left-hand side wall of the housing 3 and on this portion of reduced diameter a collar 114 is fitted and locked by a key 116. Fitted about the collar 114 is a locking collar 117, the base of which seats flatly against the adjacent face of the housing 3 and is locked against rotation by a radial key 118. The collar 117 has an annular, encircling rim flange 117a which overlaps and terminates flush with the outer face flange of the collar 114, and there is an encircling rib 114a on the hub portion of the collar 114 which engages the inner flange of collar 117 to hold the latter against slipping outward along the shaft 12 or outward relative to the collar 114.

Revolubly fitted about the extreme end portion of shaft 12 which extends beyond the collar 114 is a sleeve 120, and fitted thereover and locked thereon by keys 121 is the hub portion 124a of an indexing disk 124 provided with a peripheral flange 124' which overlaps and is revoluble upon the peripheral flange 117a of the collar 117.

Interposed between the disks 114 and 124, and revoluble about the hub portion of the latter within the peripheral rim of the disk 124, is an annular ratchet disk 125 which operates as the indexing lock releasing element.

In Figs. 13 and 14, it is shown that the front face of collar 114 is formed with nine equally spaced, radial slots 130, in each of which a locking bolt 131 is slidably fitted for movement in a direction radial of the disk.

Each bolt has a shoulder 132, see Fig. 11, projecting from its inner face and there are coiled springs 133 seated in radial sockets 134 in the hub portion of collar 114 and bearing outwardly against the shoulders of their respective bolts to urge the latter outwardly. Likewise, each bolt has a round stud 135 projecting from its outer face, and these studs extend into cam slots 136 in the disk 125. The cam slots are all inclined to the same extent and in the same relative direction, and incident to rotative action of the disk 125 in a clockwise direction, as viewed in Fig. 13, all the bolts 131 will be actuated simultaneously, and to an equal extent, inwardly or toward the axis of rotation of the disk, by reason of the stud and slot connections.

Formed in the peripheral portion 117a of the collar 117 are sockets 138 designed to receive the outer end portions of the bolts when they are in their extended positions, thereby to provide a positive, locked connection between the shaft 12 and the housing 3 when the bolts are extended; this being by reason of the fact that when extended, the bolts, which are fixedly mounted in the slots 131 of the collar 114 keyed on shaft 12, are locked in the collar 117, which, in turn, is keyed or locked to the housing 3.

Likewise, formed in the hub portion 124a of the indexing disk 124, are notches 140 designed to receive the inner end portions of the bolts when they are retracted from the collar 117 by an indexing operation. When thus retracted, the bolts are withdrawn at their outer ends from the sockets in the collar 117 and are locked at their inner ends within the notches 140 of the collar 124, thereby providing that a rotative actuation of the indexing disk 124 will, through the mediacy of disk 125 and bolts 131, effect a similar rotative action of the shaft 12.

Each indexing operation of the wheel 10 is effected by a definite oscillation of the indexing disk 124, and this is accomplished by a hydraulic cylinder mechanism, as shown in Fig. 10, wherein 145 designates a hydraulic cylinder containing a piston 146 connected by a rod 147 with a cross head 148 on a cross head guide 149. A link 150 is pivotally connected at one end, as at 151, with the cross head, and at its other end, has a pivotal connection, 152, with an arm 153 extending radially from the indexing disk.

Mounted in the rim portion of the indexing disk 124, as shown in Fig. 13, is a ratcheting pawl, or block 154, contained slidably in a guide 155. A coiled spring 156 seated in a socket in the block and bearing against a cover plate 157 overlying the guideway, urges the ratchet clock inwardly for operatively engaging ratchet teeth, or shoulders 158 equally spaced about the periphery of disk 125; there being nine of these shoulders in the present instance, and the reciprocal travel of cross head 148 is sufficient that the wheel will be advanced from one position to the next.

As a detail of construction necessary to satisfactory operation, the locking bolts 131 have the forward sides of their lower end portions tapered off, as at 160, and the corresponding faces of the sockets or notches 140 in the collar 124a in which they seat during an indexing operation, are likewise sloped, as designated at 161.

Another detail of construction is shown in Figs. 13 and 14, wherein 164 designates surfaces that are tangential to the inner face of the peripheral flange 117a at the corresponding sides of all the sockets 138. These flat surfaces 164 lead into the sockets and thereby providing that during an indexing operation, when the outer ends of the bolts 131 ride onto these surfaces 164, the bolts will be permitted to move slightly outward, thereby causing their forward edges to flatly engage with the higher opposite wall of the socket, thus to prevent possible travel of the bolts over or beyond the sockets.

Assuming the indexing disk 124 to be in the position shown in Fig. 13, an indexing operation of the wheel 10 will be effected by oscillating the disk a definite distance in a clockwise direction. Initial movement of the disk 124 causes the ratchet block 154 to seat against a shoulder 158 of disk 125 and the latter to be moved with the disk 124. Initial movement of the disk 125 causes all the bolts 131 to be actuated inwardly and disengaged from the sockets 138 of collar 114 thus to free the collar and shaft 12 for rotation. As the bolts are retracted to withdraw their outer ends from the sockets, their inner ends lock within the sockets 140 of the collar 120. Since collar 120 has a keyed connection with ratchet disk 124, there is then a locked connection between the disks 124 and 114, and the latter is keyed to shaft 112. As soon as the outer end of the bolts 131 are entirely withdrawn from the sockets 140, the indexing operation starts and the rotative travel of disk 124 continues until the outer ends of the bolts are again registered with and seated in sockets 138.

On retraction, or return travel of the ratcheting disk 124, the pawl or block 154 rides over a shoulder of disk 124 in readiness for the next operation, but shaft 12 remains locked against return movement by reason of the seating of the bolts in the sockets 138 of the locked collar 117.

Referring again to Fig. 10, it will be seen that hydraulic medium for actuating the piston 146 on an indexing stroke is admitted to cylinder 145 under control of a valve piston 168 in a valve cylinder 169. The cylinder 169 has a central port 170 through which connection is made with a connection 171 leading to a source of hydraulic pressure medium. At one end of the cylinder is an exhaust pipe 172, and connecting the cylinder 145 with cylinder 169 is a channel 173. In one position of the piston valve, pressure medium is admitted from the cylinder 169 into cylinder 145 at that end which will cause reciprocal action of the piston 146 in a direction for causing an indexing operation. When the piston valve is shifted to its other extreme, as seen in Fig. 10, it opens the cylinder 145 to the exhaust pipe 172 for return of piston 146 to starting position. Hydraulic pressure medium for the return of the piston 146 is applied through a standpipe 175 connected into the cylinder 145 opposite that end with which valve cylinder 169 connects. This standpipe would be of such height that a suitable head pressure would be insured. If additional pressure should be desired, this might be obtained by connecting the standpipe with a tank on which air is confined under pressure.

The means for actuation of the piston valve 168 comprises a piston 176, fixed on a rod 177 extended from the valve 168 and reciprocally contained in an air cylinder 176'. The rod 177 continues through and beyond the end wall of cylinder 176', and is surrounded by a coiled spring 178 which bears against a nut 179 on the rod to urge the valve 168 to exhaust position. An air pressure pipe 180 connects with one end of cylinder 176' for admitting air to move piston 176 to a position for shifting valve 168 to position for admitting pressure into the cylinder 145 to effect an indexing operation.

Air under pressure is admitted to cylinder 177 through pipe 180 under control of the master control system as will later be described.

After a charge has been compressed into a briquette in a die as a result of the actuation of the punches, the die containing the briquette will, incident to an indexing operation of the wheel 10, be brought into registration with a delivery port 185 in housing 3, as seen in Figs. 10 and 10a, from which a delivery tube 186 leads from the machine.

For ejection of the briquette, there is provided a reciprocally movable tubular shaft 190 accurately, axially alined with the die at the delivery port. This shaft is reciprocally actuated in a guideway 191 by connection at its outer end with the hammer 82 through the mediacy of a connecting bracket 192. Each time the hammer is advanced on a power stroke, it advances with it the ejector rod head 190a which enters the die containing the finished briquette and displaces the briquette from the die through opening 185 into the delivery tube 186.

As an alternative, not shown, the punch for ejecting the briquette might be actuated by means not connected with the hammer but independently timed to operate at the right time.

It is desired that the dies shall be kept polished and clean; therefore, there is a polishing brush associated with the ejector shaft, as is illustrated in Fig. 2a, wherein 193 designates a rotary brush, revoluble on an axis 194 adjacent the end of the ejector. The brush comprises an internally toothed ring gear 195 driven by a gear 196 on a short shaft 197 which, in turn has a geared connection 198 with the driven shaft 199 of an electric motor 200 that is carried by the tubular shaft at its outer end. The shaft 199 is supported coaxial of the tube and the shaft 197 is revoluble in a bearing portion 201. The brush extends just slightly beyond the periphery of the shaft and passes into and from each die with each ejection.

It is intended in the present instance that for the power stroke of the piston 94 steam shall be admitted to the outer end of cylinder 93 to drive the piston inwardly. Return of the piston to initial position is effected by the expanding force of compressed air acting against the forward face of the piston. By reference to Fig. 3, it will be seen that the inner end of cylinder 93 has a connecting passage 210 with a closed reservoir 211. When piston 94 is driven forwardly, it displaces air from the cylinder 93 and causes it to be compressed in this reservoir. Then, incident to delivery of the impact blow to form the briquette and the opening to exhaust of the outer end of the cylinder 93, the force of expansion of the compressed air will drive the piston 94 back to its initial, or starting position and thus return the hammers to starting or retracted position.

In order to prevent the delivery of an impact stroke of the hammers except in proper sequence with other operations, there is provided means for positively locking the hammers in their retracted positions until the proper time; such means being best illustrated in Figs. 4, 28, 29 and 30, wherein 215 designates a rod that is fixed to the hammer 82, continuing in axial alinement with the axis of the punches. This rod 215 extends centrally of and lengthwise through a closed, hydraulic cylinder 216, fixedly mounted on the base structure of the machine. A piston 217 is fixed on the rod for reciprocal travel in the cylinder. Opposite ends of the cylinder are connected by a pipe 218 to provide for by-passing the hydraulic medium from one side of the piston to the other, and located in this connecting pipe is a back check valve 219 adapted to a seat 220 and which, if seated, prevents flow of the liquid and consequently prevents that movement of the rod which is necessary for travel of the hammers to deliver an impact blow.

The construction and operation of the valve device 219 will be best understood by reference to Fig. 28. This shows the valve 219 seated against the valve seat 220 in the connecting pipe, and urged to this position by a coiled spring 221 bearing downwardly against the valve. The valve has a stem 222 extended downwardly through a packed gland 223 in the pipe, with its lower end exposed as a means whereby the valve can be lifted from the seat, thus to permit that flow of the hydraulic medium that is necessary for the action of the hammer to deliver a blow.

Fixed to the pipe 218 is a stirrup 225 embodying an air cylinder 226 containing a piston 227 having a rod 228 extended upwardly to a position whereby, upon lifting of the piston, the valve rod 222 will be engaged and the valve 219 unseated. An air pipe 230 enters the lower end of the cylinder and this provides for an application of air under pressure for opening the valve; the application of this air to pipe 230 being under control of the master control system.

As was previously stated, all operations of the machine are under control of a master control system which insures a proper sequence of operations thereby to avoid any possible damage that would result to any one part operating incompletely or out of turn. For example, it would be very detrimental should the hammers deliver an impact blow with the indexing wheel out of registration to receive the punches.

The master control system includes in particular the mechanism shown in Figs. 31 and 32, wherein 250 designates a valve housing formed at the top with a closed chamber 251 connected by a pipe 252 with a source of compressed air sufficient for the intended purpose. Located in the housing below chamber 251 are separate chambers 253, 254 and 255, each having a communicating port into chamber 251. Opening into the chambers 253, 254 and 255, respectively, are chambers 256, 527 and 258. Tappet valves 261, 262 and 263 are arranged to control admittance of compressed air from chamber 251 into the chambers 253, 254 and 255, respectively, while valves 264, 265 and 266 are arranged to control communication, or exhaust of air from chambers 253, 254 and 255 through the chambers 256, 257 and 258. Each valve has a mounting stem 270 acted on by a coiled spring 271 to yieldingly hold the valve seated.

Revolubly mounted in the base of the housing 250 is a cam shaft 275 on which cams 276, 277, 278, 279, 280 and 281 are formed for actuation of the valves 261, 264, 262, 265, 263 and 266, respectively, as will later be described; the relative position of these cams on the shaft being illustrated in Fig. 35. The shaft 275 extends at its opposite ends from the housing 250 and, at its left hand end, as seen in Fig. 31, extends into a housing 284 where it is equipped with a sleeve 285 with which a series of six ratchet wheels are integrally formed; the sleeve being keyed or otherwise fixed on the extended end of the cam shaft to revolve the latter.

Fixed on the housing 284 is an air motor 286 which has its drive shaft 287 fixed to and coaxial of the sleeve 285. Air under pressure is delivered to the motor 286 through a pipe 288 thereby to place the motor and its shaft under a constant torque for rotating the cam shaft 275 whenever it is released for rotation.

The ratchet wheels on the sleeve 285 are designated respectively by reference numerals 290, 291, 292, 293, 294 and 295, and each is equipped with a single tooth; the teeth of successive ratchet wheels not being aligned, but being advanced, as shown in Fig. 33, definite and equal distances relative to each other.

The teeth, designated respectively by numerals 290a, 291a, 292a, 293a, 294a, and 295a, are adapted to engage with corresponding stop slides 296 mounted in guideways 297—297' in the upper portion of housing 284. As shown best in Figs. 31 and 33, the stop slides are actuated downwardly by individual coiled springs 298 to dispose their lower end portions in positions to be engaged each by the stop tooth of its respective ratchet wheel when the wheel rotates to proper position.

It is to be understood also that normally the ratchet wheels, as well as the cam shaft 275, are stationary and do not rotate except when permitted incident to release of a stop slide from its ratchet wheel, and then the rotation is limited to that extent of the advancement of the teeth of successive wheels.

Operation of the master control is as follows:

When a charge of material is loaded into a die at the loading station, its compression effects compression of the coiled spring 46, see Fig. 5, and the plug 42 is moved outwardly accordingly. Fixed in the plug and extended from the end wall of the housing 45 is a stem 300 which, as shown in Figs. 31 and 33, operatively connects with a lever arm 301 on one end of a shaft 302 rotatably supported in a bracket bearing 303. On the other end of this shaft is a lever arm 304, connected by a link 305 with one end of a rocker lever 306 supported on the housing 284, see Fig. 33, intermediate its ends by a pivot 308. The free end of the lever 306 is operatively connected to the stop slide 296 corresponding to ratchet wheel 244 so that, incident to spring 46 being depressed to a predetermined extent, the stop slide is actuated to that position of Fig. 34 and releases the stop tooth 294a of its ratchet wheel and thus the cam shaft 275 is permitted to rotate through one interval which is an arc of 72°; it being stopped then by the tooth 293a of ratchet wheel 293 coming into contact with the corresponding stop slide 296, as designated in Fig. 41.

Assuming then that prior to this release operation by the die loading device, the cams of shaft 275 were in the position of rest of Fig. 35, it is apparent that this rotative advancement of the cam shaft will bring the cam 276 into the position as illustrated in Fig. 36, thereby to lift the valve 261 to admit air under pressure from chamber 252 into chamber 253. From chamber 253 this air pressure is transmitted through the pipe 180 which leads therefrom to the air cylinder 176', see Fig. 10, and actuates the piston valve 168 to a position for admitting hydraulic pressure medium from connection 171 into the cylinder 145, thus to actuate the piston 146 and the indexing mechanism to advance the indexing wheel 10 and locate the loaded die at the impact station.

In order that no further operation will take place unless the indexing operation is completed, I have provided the safety mechanism shown best in Figs. 40 and 41, wherein 310 designates a lever pivotally supported, as at 311, at one end upon the housing 284, and operatively connected with the stop slide 296 corresponding to ratchet wheel 293. The other end of lever 310 is operatively connected for actuation by a flexible push rod 313 mounted in guide brackets 314—314' attached to a stationary part of the machine and to the housing 284. One end of the rod extends to a position to be engaged by an adjustable abutment member 315 on the indexing disk 124 at the completion of the indexing oscillation of the disk, and will thereby, through the push rod connection, raise the stop slide 296 and permit the cam shaft 275 to be rotatably advanced another interval.

When the cam shaft is thus advanced it brings cams 276 and 277 into position shown in Fig. 37 permitting valve 261 to close, and opening valve 264. Thus, the air pressure applied to cylinder 276' through chamber 253 is cut off and is exhausted from the cylinder 176' through the connecting pipe 180 and an exhaust port 316 opening from the chamber 245. Then the spring 178, seen in Fig. 10, operates to return the valve piston 168 to a position cutting off the pressure medium to cylinder 145 and allowing the cylinder to exhaust through pipe 172; the indexing disk then is returned to position of Fig. 10 under influence of the hydraulic pressure medium contained in the stand pipe 175 and acting against piston 146.

Supplementing this safety device, there is also means which prevents any further sequence of operations should the indexing wheel not be positively locked in indexed position. This is illustrated best in Figs. 42, 43 and 44 wherein, 320 designates a push rod mounted to extend inwardly through the peripheral flange 117a of the collar 117 of the indexing mechanism. This flexible push rod operates through a tubular housing 321 and is operatively connected with a lever 322 pivotally mounted on the housing 284 at 323, to lift the stop slide 296 corresponding to ratchet wheel 292, thereby to permit the cam shaft 275 to rotate through another interval, limited by contact of the tooth 291a of ratchet wheel 291 with the corresponding stop slide 296.

The end of the push rod 320 extended through the flange 117a is located in position that it is engaged and actuated only by the outward movement of a locking bolt 131 moving into a locking socket. Therefore, the advancement of the cam shaft 275 for effecting the next operation is entirely dependent upon there being a completed and locked condition of the indexing mechanism.

The release of the cam shaft 275 incident to locking of the indexing mechanism and its rotative advancement causes the cams 278 and 280 to come to the relative position shown in Fig. 38, thereby to open valves 262 and 263, admitting pressure medium from chamber 252 into chambers 254 and 255 while the exhaust valves for these latter chambers remain closed. Chamber 255 is connected by a pipe 325 with the lower end of the air cylinder 226, shown in Fig. 28, wherein is contained the check valve release piston 227. Thus, the opening of valve 263 admits air under pressure to the cylinder 226 and unseats the back check valve 220 and opens the pipe 218 for the by-passing of liquid necessary for delivery of an impact blow by the hammers.

The opening of valve 262, likewise, admits air under pressure into chamber 254 from which this pressure is transmitted through a pipe connection 328 into a cylinder 330, see Figs. 16 and 17, in which a piston 331 is slidably fitted. This piston is connected by a link 332 with the rocker lever arm 112 on the supporting shaft 113 previously mentioned. This rocker shaft, as shown best in Figs. 2 and 20, is disposed transversely of the machine and is supported for an oscillating action, in bearings 333—333'.

When air is admitted into the right hand end of cylinder 330, with reference shown in Fig. 16, it drives the piston 331 to the left thereby to rock the lever 112 to a position at which the steam control valve piston 105 will be moved to "open" position to admit steam from the supply pipe 107 into the main steam cylinder 93 to drive the hammers inwardly to cause the punches to deliver their impact blow on the material in a charged die, thus to form the briquette.

Actuation of the steam valve 105 to "closed" position to cut off the admittance of steam to cylinder 93 at a desired position of the piston, and later to "exhaust" position to exhaust this steam pressure from the cylinder, is under control of a reciprocating cam mechanism acting on the valve through the mediacy of shaft 113, lever 112 and rod 111.

The cam mechanism includes a horizontally disposed base plate 335, reciprocally mounted in guideways 336 of a supporting bed 337 fixed upon a stationary cross frame member 338. The plate is connected at its forward end with a standard 339 on the hammer 81 so that it reciprocates with and to the same extent as the hammer.

As will be observed by reference to Figs. 19 and 21, a transverse rocker head 340 is fixed on cross shaft 113 and this is equipped at its opposite ends with cam rollers to be acted against by cams, later to be described, fixed on the cam plate 335. The relative positions of these rollers is best seen in Fig. 19a wherein the rocker head is shown in plan view. At one end of the head (the left hand end as viewed in Figs. 19 and 19a) there are three rollers designated respectively by reference characters 341—342 and 343, arranged in axial alinement. At the other end of the head are two rollers 344 and 345, these being in axial alinement with each other and also alined, respectively, in the direction of reciprocation of the cam plate, with the rollers 341 and 343.

At the start of an impact operation of the piston 94, it is located at the outer end of cylinder 93, as seen in Fig. 3, and the steam valve piston is in "cut off" position of Figs. 15 and 21. When air is admitted to cylinder 330, this, through the action of piston 331, link 332, lever 112 and rod 111, moves the valve 105 to open position and steam is admitted to cylinder 93 to drive the piston 94 inwardly. Incident to the reciprocal travel of hammer 81, the cam plate 335 moves accordingly.

At the start of the forward reciprocal movement of the cam plate 335, the rocker head 340 is in the inclined position in which it is shown in dotted lines in Fig. 19, thus placing the rollers at the left end of the rocker head in a higher plane than those at the right. After the cam base plate has moved forwardly through a predetermined distance, which, in this instance is approximately seven inches, a cam 350 fixed thereon engages the roller 341 and rocks the head to the horizontal position of Fig. 21 and thereby shifts the steam valve 105 to "cutoff" position. The cam 350, in actuating the rocker head to this position, brings the roller 344 down against a cam 352 mounted on the cam plate, to prevent any possible over travel of the steam cut-off valve due to inertia. The piston 94 is then driven forwardly, to complete its stroke, by the pressure of expansion of the steam previously admitted to the cylinder.

When the piston 94 is approximately at the end of its power stroke, a cam 354 fixed on the cam plate engages the roller 342 and rocks the head 340 to the position of Fig. 24, thereby shifting the steam valve to "exhaust" position shown in dotted lines in Fig. 21.

It will be explained here that the cam 352 is mounted on the plate 335 in a manner permitting it to be shifted laterally relative to the direction of reciprocation. As will be observed by reference to Fig. 18, the cam is slidably contained between gibs 355—355' and at its outer edge mounts a roller 356, see Fig. 20, which is adapted, during the power stroke of the piston and at the time of steam cut off, to engage an outwardly inclined surface 357' of a stationary cam block 357 fixed to base 337 thereby to pull the cam 352 outwardly and out of alinement with the rocker head rollers. Thus, cam 352, after serving its purpose of insuring the steam valve against overtravel, it is drawn out of the way so as not to interfere with the setting of the rocker head during the remainder of the power stroke. It will be explained here also that on the return stroke of the piston, and near the completion thereof, the cam roller 356 engages with an inwardly inclined surface 358' of a cam block 358 fixed to base 337 and this causes the cam 352 to be moved inwardly to its starting position, at which it is again alined with the rocker head roller 344, as seen in Fig. 18.

The return of "exhaust stroke" of the piston 94 is effected by the expanding pressure of compressed air in the storage reservoir 211; this pressure being built up, as was previously explained, by the forward travel of the piston. If desired, this cam 350 might be eliminated thereby to obtain the maximum driving force of the piston.

On the return of "exhaust" stroke of the piston 94, a cam 360 fixed on the cam plate moves into engagement with the roller 345 and rocks the head back to "neutral" position as shown in Fig. 26. This action brings the steam valve back to "cut off" position, as in Fig. 21. The rocker roller 343 is thereby brought into engagement with a cam 361 on the plate, which limits the action of the steam valve and prevents any possible over travel. The cam 361 is also mounted for lateral shifting on plate 335, as is the cam 353, and it is actuated into and from alinement with the rollers 343—345 by means of a cam roller 363 fixed thereon to engage with an inwardly inclined surface 364' of a fixed cam block 364 as the plate 335 moves inwardly on the power stroke and it engages an outwardly inclined surface 365' of a block 365 to pull the cam outwardly and in the clear of the rocker rollers after the actuation of the steam valve to "cut off" position during the exhaust stroke.

As the cam plate 335 is brought by the return of the hammer 81 back to starting position, the roller 356 on cam 352 engages the inwardly inclined surface 358' of the fixed cam 358 and this actuates the cam inwardly to starting position aligned with the cam roller 344.

As the hammers start inwardly on an impact stroke, a cam plate 370 that is fixed on the top surface of the hammer, as shown in Figs. 45, 46 and 47, moves into lifting engagement with a cam roller 371 on a rocker lever 372 supported by a pivot shaft 373; the pivot shaft being supported by a bracket 375 attached to the hammer guide, as shown in Figs. 1 and 47. The lever 372 is connected by a link 377 with a rocker lever 378 supported by a pivot 379 on housing 284 and operatively connected with the stop slide 296 corresponding to ratchet wheel 291. Thus, when the forward travel of the hammer 81 effects the lifting of arm 372, the ratchet wheel 291 is released and the cam shaft 275 is permitted another rotative advancement, which brings the cams 278 and 279 to the positions shown in Fig. 39 and thereby closes valve 262 and opens the exhaust valve 265 permitting the exhaustion of air from the cylinder 330 and thereby freeing the steam valve for movement under influence of the cam mechanism.

As an added precaution to insure the exhaust of air from cylinder 330 at the start of each impact stroke of the hammers, there is an exhaust port 384 provided on the end wall of cylinder 330, as shown in Figs. 16 and 17. This port is normally closed by a slide valve piston 386 adapted to be actuated to open position by a spring 387 acting against its valve stem 388, each time the hammer moves on the impact stroke. On the return stroke of the hammer 81, a cam 390 fixed thereon engages a cam head 391 on the lower end of stem 388 to lift the valve to again close the exhaust port.

Also, with the return of the hammers to their outer positions, a cam 392 on hammer 81, shown in Figs. 48, 49, 50, actuates a one way rocker lever 393 supported on the pivot shaft 373 to actuate an arm 394 connected by a link 395 with a lever 396 pivoted on housing 284 to lift the stop slide 296 corresponding to ratchet wheel 290, thereby to release the cam shaft 275 for another rotative advancement whereby it is brought back to the original or "starting" position, at which the cam 281 moves to a position to open valve 266 to exhaust air from the check valve cylinder 226 and allow the check valve to be seated and thus prevent any possible return of the hammers until another cycle has been started; the cams then assuming the position of Fig. 35.

In Fig. 30 there has been illustrated a relief, or compensating valve to effect readjustment of the piston 94 in the event of possible over travel on its return stroke. It is to be observed that the piston contains a relief valve 400 adapted to a seat 401. The valve has a stem 402 extended through the piston and a coiled spring 403 acts against a nut 404 on the stem to hold the valve seated. Should there be an over travel of the piston, its stem will be brought into contact with an adjustable stop 405 in the nature of a bolt threaded through the cylinder head, and this will open valve 400 and allow liquid to flow through the valve passage, thus to permit return of the piston 217 to a designated position.

In order that the machine will be positively locked against starting on a cycle of operations without there having been a complete return of the indexing mechanism to initial position, there is provided a mechanism shown in Figs. 51, 52 and 53, wherein 410 designates a flexible push rod contained in a tubular housing 411. The push rod is connected at one end with a rocker lever 412 pivoted on housing 282 for actuation of the stop slide 196 corresponding to ratchet wheel 295 of the master control system; the locking tooth 295a of this wheel is radially aligned with the tooth on the ratchet wheel 290. The upper end of the push rod 410 is located in position to be engaged by the cross head 148 of the indexing mechanism at the completion of its return stroke, thereby to actuate the lever 412 to lift the stop slide to release it from the ratchet wheel. It is apparent that, should the indexing means not return completely to its initial or starting position, the ratchet wheel 295 would remain locked and there could be no starting of the machine.

As will be observed by reference to Figs. 31, 54 and 55, the release of the cam shaft 275 of the master control system for starting the machine and also the locking of this shaft to stop the operation of the machine, is under control of a hand lever 415 which is pivotally supported by pivot stud 416 that is fixed in the supporting bracket 418 which mounts the master control system. The hand lever extends transversely across an end portion of the shaft 275 that extends through and beyond the housing 284, where the shaft is equipped with a ratchet wheel 419 having teeth 419a thereon. On the lever is a stop 420 adapted to lock against a tooth of the wheel to hold the cam shaft from rotating and thereby stop operation of the machine. A thumb latch 421 is pivoted on the lever, as at 422, and is urged by means of a coiled spring 423 against a stop shoulder 424 on the housing, thereby to hold the lever arm in locked position. When the thumb latch 421 is depressed and is thereby released from the stop shoulder, the lever is then urged upwardly to "release" position by means of a coiled spring 425 which bears downwardly against a rearwardly extending toe 427 on the lever, as seen in Fig. 54.

In order to prevent any possibility of damage being done to the machine should the indexing wheel, for any reason, be turned in a reverse direction, I have provided means for automatically stopping the machine instantly should this take place; it being understood that the possibility of such reverse turning of the indexing wheel would occur in the event that the indexing disk should, for some reason, stick on its supporting axis. The means for effecting this stopping of the machine is illustrated in Figs. 54 and 55, wherein 430 designates a stub shaft that is threaded by means of long, spiral thread 431 coaxially into a sleeve 432 that is fixed coaxially on the end of the indexing disk. On the stub shaft is a ratchet wheel 433 engaged by a pawl 434 pivotally mounted at 435 by a bracket 436 that is fixed on a stationary part of the machine. A spring 437 urges the pawl against the ratchet. In normal advance operations of the indexing wheel, the ratchet rotates and the pawl rides over the teeth thereof. Should there be a reverse rotation of the indexing wheel, the ratchet is held against rotation by the pawl and is moved outwardly by reason of the threaded connection with the sleeve 432.

Referring now to Fig. 55, it is observed that a horizontal shaft 440 is mounted in bearings 441 and 441' of a supporting bracket 442. Fixed to one end of this shaft 440 is a lever 443 having a yoke 444 at its lower end embracing the hub portion 433a of the ratchet wheel 433 and having an operative connection therewith whereby outward shifting of the ratchet incident to the reverse action of the indexing wheel effects an outward swinging of the lever 433 and a resultant rotative action of the shaft 440. Fixed on the shaft 440, as seen in Fig. 54, is a lever arm 450 which underlies the toe 427 of the release lever. Therefore, this rotative action of shaft 440 that results from reverse rotation of the indexing wheel causes an upward swinging of the lever arm 450 and a resultant downward swinging of the lever 415 to its locked position of Fig. 54, thereby causing the tooth 420 to lock with a tooth of the ratchet wheel 419 to stop rotation of the cam shaft 275 and thereby stop the machine.

In Fig. 59 is illustrated the alternative means for feeding the comminuted material into the hopper 62 for delivery in a vacuumized condition to the dies. In this illustration, 460 designates a vertical tube opening at its lower end in an air tight connection into the hopper 62. At its upper end, it is open and adapted to receive directly therein the comminuted material. Preferably, this pipe would be of a substantial length; for instance, fifteen to twenty feet long. Encircling the pipe near its connection with the hopper 62 is an annular chamber 461 with which a vacuumizing pipe 462 is connected. The material fed to the hopper should at all times fill the tube 460 to its upper end. Thus, the vacuumization afforded through the pipe 462 and the pipe 63 which opens into the hopper 62 is effective for the intended purpose and is made possible by reason of the fact that the length of tube above the level of the chamber 461 is sufficient that when filled, it will effect a substantial seal, preventing loss of vacuum in the compartment 62. In this pipe 460, the material will feed automatically by gravity and by reason of the vacuum pull. If the pipe is smooth, there will be no difficulty in maintaining the feed, and by reason of the pre-vacuumizing in the compartment 461, it will be relatively easy to complete the vacuumization in the compartment 62.

In view of the extreme desirability that all operations of the machine shall be under a positive control that will prevent any possible damage due to parts becoming unsynchronized, it has been contemplated that each of the release elements in the master control device be supplemented, thereby to doubly insure the safety of the machine. In Figs. 60 and 61, there has been illustrated the means for supplementing the release of the master control mechanism actuated by the building up of compression in the loading die. By reference to Fig. 5, it will be observed that when the material is compressed to a desired extent in the die 11, the spring 46 will be compressed, thereby to actuate the push rod 300 which, as has previously been described, releases a pawl from a certain ratchet of the master control, permitting a limited rotation of the cam shaft, thereby to bring about the next operation, which is the indexing of the die to the next station. In the event that the push rod 300 should stick, or in the event that some other unexpected act should occur that would prevent the locking pawl from dropping into its normal position, the machine would be left free for a subsequent indexing operation without the die being loaded, and possibly while parts would be in position that damage would result. To doubly insure against such an occurrence, the modification illustrated in Figs. 60 and 61 discloses a ratchet wheel 500 that is interposed between the ratchets 294 and 295. This would have a tooth 501 aligned with the tooth 294a of the ratchet wheel 294, and there would be provided a stop rod 502 aligned with the rod 296. A solenoid 503 would be electrically connected to lift the rod 502. The solenoid is in an electric circuit having circuit wires 504 and 504a leading to a source of electricity 505 through a pressure control switch 506 which is closed by a predetermined increase in pressure in the tank 50.

It will be understood that when the die 11, being filled by the reciprocal action of the plunger 32, has been charged, the piston 33 will back up in the cylinder 34, and thereby increase the pressure of air in the tank 50. This can be made to cause the switch 506 to close the circuit, thereby to lift the pawl 502 coincident with the lifting of the pawl 296. However, since the die is forwardly registered, the pressure in the tank 50 will be relieved and the pawl 502 will drop into stopping position and will operate to maintain the safety of operation regardless of whether or not the pawl 296 returns. The chances of both devices failing to function is so remote that it might be said with accuracy that the dual control absolutely insures safety of operation in this respect.

While I have not so illustrated it in connection with all of the other units of the master control system, it is to be understood that each of the ratchets, and pawls could be supplemented by another to operate coincident therewith and under control of some positively actuated member. While it was not so explained, it might be said that the device of Fig. 51 supplements one of the other safety features of the machine.

Having thus described my invention, what I claim as new therein and desire to secure by Letters Patent is—

1. In a press for fuel briquettes, a vacuumized die, open at its opposite ends, means for charging the die with a finely divided material packed thereinto under air displacing compression, rams arranged to enter the die from its opposite ends, and means for simultaneously actuating the said rams to compress the material into unity by sudden impact.

2. In a press for fuel briquettes, a vacuumized die, open at its opposite ends, means for filling the die with a charge of finely divided material packed therein under air displacing compression, rams arranged to enter the die from its opposite ends for compressing the charge therein, means for applying power to the rams to actuate them to compress the material into unity by opposedly applied impact forces.

3. In a press for fuel briquettes, an indexing wheel, a plurality of vacuumized dies mounted therein, means for holding a supply of comminuted material under vacuum, means for packing the dies with said material while under vacuum, an indexing mechanism for intermittently advancing the wheel to successively register the dies with the die packing means, rams arranged to enter the opposite ends of a charged die for compressing the charge, and means for applying power to the rams for a simultaneous and balanced application of impact forces.

4. In a press for fuel briquettes, an indexing wheel, a plurality of vacuumized dies, open at opposite ends, mounted on the wheel, a vacuumized hopper for a supply of comminuted material, a die charging ram operable to deliver the material and pack it into the dies, an indexing mechanism operable to intermittently advance the wheel to successively locate the dies in position for charging by said ram, a pair of opposedly acting rams arranged to enter opposite ends of the charged dies, a power mechanism for actuating the latter rams, and means operatively connecting them for simultaneous and equal movement, and whereby their impact forces are balanced.

5. In a press for fuel briquettes, an indexing wheel, a plurality of dies open at their opposite ends arranged therein, a supply hopper having connection with a loading tube, an indexing mechanism for intermittently advancing the wheel to register the dies successively with the loading tube, a die loading ram operable in the tube for loading the dies under pressure, reciprocally movable rams arranged to enter the charged dies from opposite ends, means interconnecting the rams for simultaneous action and through which connection impact forces are balanced, a power device for actuating the rams and operable under control of the indexing mechanism.

6. In a press for the manufacture of briquettes from comminuted material, a vacuumized die, means for charging the die with material under an initial air excluding pressure, means for compressing the material in the die by impact forces suddenly applied.

7. In a machine of the character described, a vacuumized die, a hopper for material with which the die is to be charged, means for charging the die with material from the hopper under an initial air excluding pressure, means for vacuumizing the hopper and die, and means for effecting unity of the charge of material in the die by sudden impact.

8. In a machine of the character described, a closed hopper for comminuted material, an indexing wheel mounting a plurality of dies, a die loading ram, an indexing means for successively presenting the dies to the loading ram, a yieldable closure for the die opposite the ram for controlling the indexing means, means for finally compressing the charges of material in the dies to form briquettes, means for ejecting the briquettes from the dies, a housing for the dies, and means for maintaining the hopper and housing in a vacuumized condition.

9. In a press of the character described, an indexing wheel, a plurality of dies arranged at intervals therein, a hopper for comminuted material, a die charging connection between the hopper and wheel, an indexing mechanism for intermittently advancing the wheel to successively position the dies in registration with the die charging connection, a reciprocating loading ram in said charging connection for charging the dies with material from the hopper, and yieldable means operating as a closure for one end of the die while being charged and adapted to be depressed incident to a predetermined charging of the die, and devices actuated by the depression of said closure to effect an indexing operation of the wheel.

10. In a press of the character described, an indexing wheel, a plurality of dies arranged at intervals therein, a hopper for comminuted material, a die charging connection between the hopper and wheel, an indexing mechanism for intermittently advancing the wheel to successively position the dies in registration with the die charging connection, a reciprocating ram operable in the connection to progressively charge each of the dies with material from the hopper, means for actuating the ram, and yieldable means operating as a closure for one end of the die while being charged and adapted to be depressed incident to a predetermined charging of the die, and devices actuated by the depression of said closure to effect an indexing operation of the wheel, impact devices, and means operating under control of the indexing means for actuating the impact devices to compress the charges of material in said dies.

11. A device as in claim 10 wherein the reciprocating ram has a yielding connection with its actuating means.

12. A device as in claim 10 wherein the ram actuating means comprises a crank shaft, means connecting the crank shaft with the ram for effecting reciprocation thereof, and an air cushion interposed in the connection permitting yielding of the ram incident to the filling of the die.

13. In a press for fuel briquettes, a vacuumized die, means for progressively charging the die with a finely divided material packed thereinto under pressure, and means for compressing the charge of material in the die into unity by impact forces.

14. In a press for fuel briquettes, a vacuumized die, a ram for progressively filling the die with a charge of finely divided material packed thereinto under pressure, and means for compressing the charge of material in the die into unity by impact forces suddenly applied.

15. In a press for fuel briquettes, a vacuumized hopper containing a supply of finely divided material, a vacuumized die and a reciprocating ram operable to charge the die progressively with material delivered under pressure, and rams operable to compress the charge into unity by impact.

WORTH C. GOSS.